US012727016B2

(12) United States Patent
Lyu et al.

(10) Patent No.: US 12,727,016 B2
(45) Date of Patent: Sep. 1, 2026

(54) ENHANCED FRONT-HAUL INTERFACE TO SUPPORT LOW LATENCY COMMUNICATION

(71) Applicant: Dell Products L.P., Round Rock, TX (US)

(72) Inventors: Yongxia Lyu, Ottawa (CA); Jia Liu, Newmarket (CA); John Bradley Deforge, Chelsea (CA)

(73) Assignee: DELL PRODUCTS L.P., Round Rock, TX (US)

( * ) Notice: Subject to any disclaimer, the term of this patent is extended or adjusted under 35 U.S.C. 154(b) by 282 days.

(21) Appl. No.: 18/747,722

(22) Filed: Jun. 19, 2024

(65) Prior Publication Data

US 2025/0393061 A1 Dec. 25, 2025

(51) Int. Cl.

*H04W 72/512* (2023.01)
*H04L 1/18* (2023.01)
*H04L 12/46* (2006.01)
*H04L 69/326* (2022.01)

(52) U.S. Cl.

CPC ............. *H04W 72/512* (2023.01); *H04L 1/18* (2013.01); *H04L 12/4633* (2013.01); *H04L 69/326* (2013.01)

(58) Field of Classification Search

CPC ............. H04W 72/512; H04L 12/4633; H04L 69/326; H04L 1/18

See application file for complete search history.

(56) References Cited

U.S. PATENT DOCUMENTS

2024/0357594 A1* 10/2024 Wu ........................ H04W 72/20
2025/0324321 A1* 10/2025 Metsälä ............ H04W 28/0284

FOREIGN PATENT DOCUMENTS

WO WO-2025253163 A1 * 12/2025 ........ H04W 28/0289

OTHER PUBLICATIONS

Liu, et al. “WG9 Open Xhaul Transport WG” O-RAN https://public.o-ran.org/display/WG9/Introduction, Last Accessed May 24, 2024, 2 pages.

Andou, et al. “WG4 Open Fronthaul Interface” O-RAN, https://public.o-ran.org/display/WG4/Introduction, Last Accessed May 24, 2024, 1 page.

(Continued)

*Primary Examiner* — Derrick V Rose

(74) *Attorney, Agent, or Firm* — Amin, Turocy & Watson, LLP

(57) ABSTRACT

Low latency communication support via an enhanced front haul interface is presented. An example method comprises receiving within a packet stream a first data packet associated with a time sensitive communication requirement and a second data packet associated with a time tolerant communication requirement, determining that the first data packet is associated with a last hybrid automatic repeat request opportunity within a defined latency budget for transmission to receiver equipment, assigning a high enhanced common public radio interface value to the first data packet, encapsulating using an enhanced common public radio interface encapsulation process, the first data packet to create a first encapsulated data; and using a transport layer network encapsulation process to encapsulate the first encapsulated data to generate a second encapsulated data.

20 Claims, 17 Drawing Sheets

(56) References Cited

OTHER PUBLICATIONS

O-Ran "O-Ran Alliance Introduces Minimum Viable Plan Towards Commercial O-RAN Solutions and 28 New O-RAN Specifications Released Since Nov. 2020" https://www.o-ran.org/blog/o-ran-alliance-introduces-minimum-viable-plan-towards-commercial-o-ran-solutions-and-28-new-o-ran-specifications-released-since-november-2020, Last Accessed May 24, 2024, 12 pages.

* cited by examiner

900

| Latency Class | Max. One-way Frame Delay Performance | Use case |
|---|---|---|
| High25 | 25 µs | Ultra-low latency performance |
| High75[1] | 75 µs | For full NR performance with fiber lengths in 10km range |
| High100 | 100 µs | For standard NR performance with fiber lengths in 10km range |
| High200 | 200 µs | For installations with fiber lengths in 30km range |
| High500 | 500 µs | Large latency installations > 30 km |
| Medium | User Plane (slow) & C&M Plane (fast) | 1 ms |
| Low | C&M Plane | 100 ms |

| Category | Feature | O-DU support | O-RU support | Additional information |
|---|---|---|---|---|
| | Local PRTC | Optional | Optional | O-DU (in LLS-C1/C2/C3/C4) or O-RU (in LLS-C4) may optionally be synchronized from a local time source, for example GNSS-based. |
| **Transport Features** | **L2: Ethernet** | **Mandatory** | **Mandatory** | |
| | L3: IPv4, IPv6 (CUS Plane) | Optional | Optional | |
| | **QoS over Fronthaul** | **Mandatory** | **Mandatory** | |
| | Prioritization of different U-Plane traffic types | Optional | Optional | |
| | Support of Jumbo Ethernet frames | Optional | Optional | |
| | **eCPRI** | **Mandatory** | **Mandatory** | |
| | support of eCPRI concatenation | Optional | Optional | |
| | IEEE 1914.3 transport header | Optional | Optional | See clause 5.1.3.3. |
| | **Application layer fragmentation** | **Mandatory** | **Mandatory** | C-Plane and U-Plane. |
| | Radio Transport layer fragmentation | Optional | Optional | U-Plane (see clause 5.1.3.2.8). |

| Section Type: any | | | | | | | | | |
|---|---|---|---|---|---|---|---|---|---|
| 0 (msb) | 1 | 2 | 3 | 4 | 5 | 6 | 7 (lsb) | # of bytes | |
| ecpriVersion | | | | ecpriReserved | | | ecpriConcatenation | 1 | Octet 1 |
| ecpriMessage | | | | | | | | 1 | Octet 2 |
| ecpriPayload | | | | | | | | 2 | Octet 3 |
| ecpriRtcid / ecpriPcid | | | | | | | | 2 | Octet 5 |
| ecpriSeqid | | | | | | | | 2 | Octet 7 |

| ecpriReserved field in eCPRI header | Priority level for eCPRI packet |
|---|---|
| 000 | 1, the lowest priority |
| 001 | 2 |
| 010 | 3 |
| 011 | 4 |
| 100 | 5 |
| 101 | 6 |
| 110 | 7 |
| 111 | 8, the highest priority |

| eCPRI priority in eCPRI header | Priority level for eCPRI packet |
| --- | --- |
| 000 | 1, the lowest priority |
| 001 | 2 |
| 010 | 3 |
| 011 | 4 |
| 100 | 5 |
| 101 | 6 |
| 110 | 7 |
| 111 | 8, the highest priority |

FIG. 15

ENHANCED FRONT-HAUL INTERFACE TO SUPPORT LOW LATENCY COMMUNICATION

BACKGROUND

Ultra-reliable low latency communication (URLLC) services are one of the key service categories defined in 5G networks. URLLC services are designed to support mission-critical applications that can require extremely high reliability and very low latencies. Examples of such mission-critical applications can include industrial automation, autonomous vehicles, remote surgery, and the like.

Some key features and requirements of URLLC services include: ultra-reliability—providing a reliability of at least 99.999%, thereby ensuring that data packets are delivered successfully almost all the time and particularly for crucial application where failure or data loss can result in severe, and occasionally catastrophic, consequences; low latency—since crucial applications can require real-time or near real-time responses, URLLC services need to ensure end-to-end latencies that are below at least 1 microsecond; high availability—ensure that the network is available to handle URLLC traffic without interruption through the use of processes such as redundant paths and fast failover mechanisms to maintain high availability; high mobility support—URLLC services need to maintain performance even when user identities or devices are moving at high speeds, such as in high-speed trains or vehicles; and/or resource allocation and management—providing for the efficient and dynamic allocation of network resources to handle the stringent requirements of URLLC traffic, and the prioritization of URLLC traffic over other types of traffic to ensure low latency and high reliability.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 9 depicts a table of one-way delay requirements on a front-haul interface, in accordance with various non-limiting example embodiments.

FIG. 10 provides a table that details O-RAN mandatory and operational features, in accordance with various non-limiting example embodiments.

FIG. 11 depicts a table illustrative of eCPRI transport header field definitions, in accordance with various non-limiting example embodiments.

FIG. 14 illustrates a table of priority levels indicated by eCPRIReserved field in an eCPRI header, in accordance with various non-limiting example embodiments.

FIG. 15 illustrated another table of priority levels indicated by eCPRI priority in an eCPRI header, in accordance with various non-limiting example embodiments.

DETAILED DESCRIPTION

Figure 1:
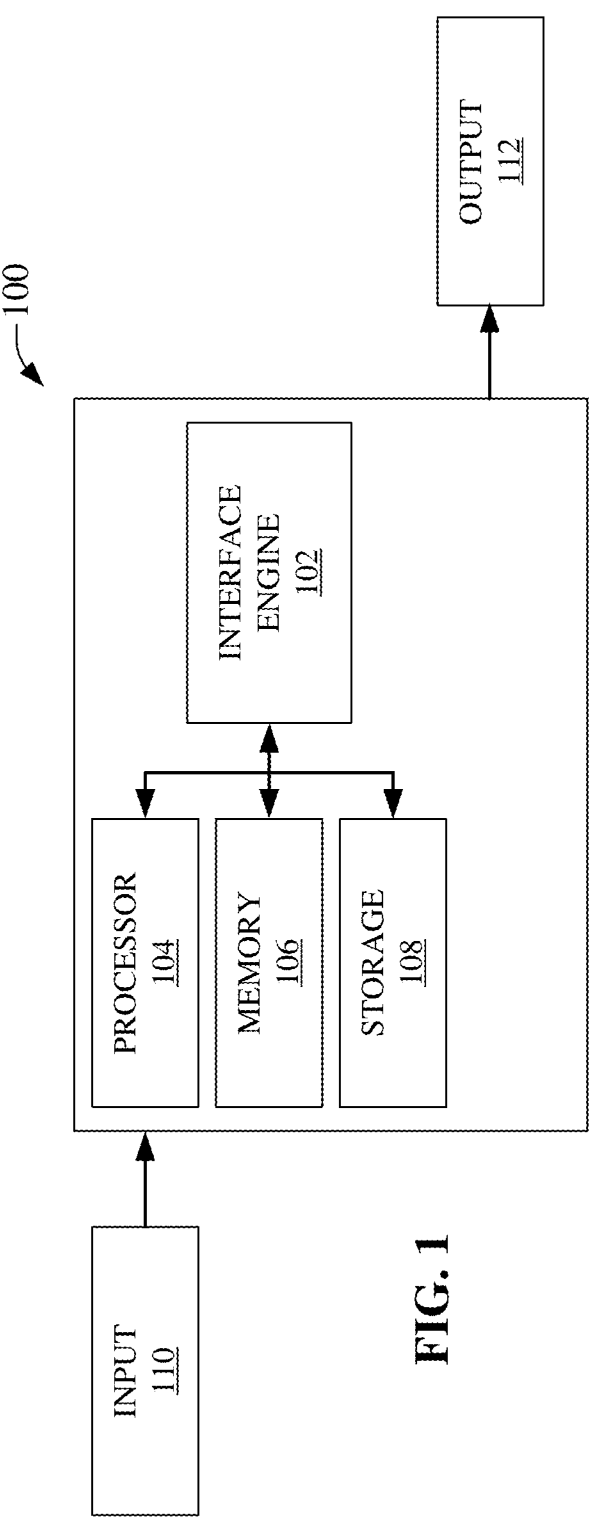
FIG. 1 illustrates a block diagram of a system to support low latency communication via an enhanced front haul interface, in accordance with various non-limiting example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Ultra-reliable low latency communication (URLLC) services are a pivotal component of fifth generation (5G) communications networks, enabling a wide range of mission-critical applications that can require ultra-high reliability and ultra-low latency. By leveraging advanced technologies such as network slicing, edge computing, massive multiple input multiple output (MIMO) methodologies (e.g., multiplying the capacity of radio links using multiple transmission and receiving antennas to exploit multipath propagation), and flexible frame structures, URLLC meets the stringent requirements necessary for applications like industrial automation, autonomous vehicles, remote surgery, and more. Despite the challenges in resource management, interference mitigation, and energy efficiency, URLLC represents a significant advancement in the capabilities of mobile networks, paving the way for innovative applications and services in various industries.

To support URLLC services that can have extreme latency requirements (e.g., less than 1 microsecond end-to-end latencies) an enhanced common public radio interface (eCPRI) associated with defined delay classes (or latency classes) need to be used to categorize different types of traffic based on their latency requirements. These delay and/or latency classes ensure that various applications, which can have different sensitivity to delays, receive an appropriate quality of service (QoS).

In regard to the eCPRI, this interface (and its associated protocol) can be a critical interface and/or protocol designed to support the efficient transmission of data between the radio equipment (RE) and radio equipment control (REC) equipment in modern mobile networks, particularly for 5G. The eCPRI addresses the limitations of its predecessor, the common public radio interface (CPRI), by offering higher bandwidths, lower latencies, and more flexibility, which can be essential for the advanced functionalities and performance requirements of 5G. For purposes of this disclosure RE can be devices and systems used for transmitting, receiving, and processing radio waves. RE typically can comprise at least transmission equipment, receiver equipment, antennas, modulator and/or demodulator equipment, amplifying equipment, and/or oscillator equipment. REC equipment can be systems, devices, and software used to manage and control radio communication equipment. Generally, REC equipment provide functionalities such as controlling the operating frequencies of radio equipment to avoid interference and ensure optimal performance (e.g., frequency management); adjusting the transmission power to balance coverage and reduce interference (e.g., power control); mode selection capabilities to switch between different modes of operation such as amplitude modulation (AM), frequency modulation (FM), digital, and the like; allocating channels to different users or services to manage bandwidths efficiently (channel assignments); and/or real-time monitoring of equipment status, performance metrics, and fault diagnostics.

It should be observed, solely for purposes of exposition of this disclosure, use is being made of the H25 or H75 delay classes. The subject disclosure is not necessarily limited to these delay classes as other diverse delay classes can also be used with equal functionality and/or facility. The H25 delay or latency classification can generally be associated with applications that, when in execution, mandate maximum one-way frame delay performances of less than approximately 25 microsecond (μs). The H25 delay class typically can be used for applications that require ultra-low latency performance.

In regard to the H75 delay or latency class, this classification can generally be associated with applications that, when in execution, necessitate maximum one-way frame delay performances of about 75 μs. Generally, the H75 latency classification can be employed for applications that require full near real-time performance using fiber lengths in the range of about 10 kilometers (km). For additional reference and comparison a table 900 of one-way delay requirements on a front-haul interface is presented as FIG. 9.

Currently, all data flows, regardless of delay or latency classification, flow through a same eCPRI lane, data classified as being data that requires ultra-low latency performance of not more than 25 μs and/or data can be classified as being data the needs near real-time performance (e.g., within at least 75 μs) can also be included in these data flows. By directing each and every data flow, without accommodation for appropriate delay or latency classifications, can be a source of significant overhead/bottlenecks for data that can have been categorized as being in a H25 or H75 delay or latency class.

The exposition detailed herein provides mechanisms to dynamically and in real-time assign priorities for each eCPRI data packet associated with an eCPRI radio transport channel identifier (RTCID) in any eCPRI lane. The ecpriRtcid is an identifier that can be used to distinguish between different data flows and channels within the eCPRI protocol stack. The ecpriRtcid can be generally used to connect remote radio unit (RRU) equipment with baseband unit (BBU) equipment in wireless telecommunications networks, and particularly in 5G networks.

Additionally, the disclosure also provides mechanisms to dynamically assign priorities for each eCPRI data packet associated with an eCPRI port channel identifier (PCID) in any eCPRI lane. The ecpriPcid can generally be used to uniquely identify a specific port channel within an eCPRI interface, and can play a critical role in managing and routing data between the RE and the REC equipment.

The disclosed mechanisms to dynamically assign priority for each eCPRI data packet in an eCPRI lane can entail determining eCPRI data packet priority data associated with an eCPRI data packet based on whether or not the eCPRI data packet is: associated with the last hybrid automatic repeat reQuest (HARQ) transmission opportunity; or is indicated by the priority data received as physical layer data and/or scheduling data. The eCPRI priority data can provide indication that can be used to advance the eCPRI data packet to the head of the eCPRI lane (or queue) and/or preempt other ongoing processing and transmission of other packets that can be ahead of the eCPRI data packet at issue; more succinctly, the eCPRI data packet associated with the highest eCPRI priority data jumps to the front of the eCPRI queue ahead of all other eCPRI data packets that are already extant in the eCPRI queue and are associated with lesser eCPRI priority data. Advancing eCPRI data packets associated with the highest eCPRI priority data, reduces processing times in order to satisfy QoS metrics associated with the H25 and/or H75 delay classifications.

For open radio access network (O-RAN) implementations with multiple eCPRI lanes or queues associated with different delay classifications and/or different delay classes, eCPRI data packets associated with the highest delay classification can be transmitted using a eCPRI lane or queue associated with delay class A—a high-priority, low-latency class designed to meet rigorous performance requirements in order to support applications with stringent low-latency requirements. Lane delay class A is generally reserved for traffic that requires the highest priority and the lowest possible delay. Generally, lane delay class A can be characterized as having a extremely low latency budget, thereby ensuring that data packets experience minimal delay during transport; high reliability and minimal packet loss, which can be critical for real-time and mission-critical applications; and traffic in this class can be afforded the highest priority over all other classes, thus ensuring that such traffic is processed and transmitted with the least amount of delay.

This disclosure details different encapsulation rules to be used for high priority eCPRI packet data and non-high priority packet data. For instance, in some embodiments the encapsulation rules for high priority eCPRI packet data, in contrast to non-high priority packet data, can be that with high priority eCPRI packet data the packet data should not be fragmented unless such fragmentation is absolutely necessary. Additionally and/or alternatively high priority eCPRI packet data should not be concatenated with non-high priority packet data. By not concatenating high priority eCPRI packet data with non-high priority packet data a great deal of time can be saved during the de-capsulation phase.

As has been intimated earlier, currently there is no different transmission for all data transmissions associated with an ecpriRtcid/ecpriPcid (typically 16-bits) over an eCPRI lane—all data transmissions associated with an ecpriRtcid/ecpriPcid are assumed to be subject to similar delays for all data transmissions associated with a specified ecpriRtcid/ecpriPcid over a defined eCPRI lane since the ecpriRtcid/ecpriPcid is defined for a defined band, a defined sector, a defined component carrier, a defined radio unit (RU) port, and/or a defined distributed unit (DU). This one size fits all approach is generally not suitable for services that are both time critical and rely on defined reliabilities in service as measured, for example, by QoS metric data. In order to remedy the foregoing deficiencies, the subject disclosure provides dynamic priority transmission over eCPRI lane by setting different priority levels for data transmissions belonging to a determinable ecpriRtcid/ecpriPcid to reduce processing delays in the eCPRI lane, and further introduces an eCPRI lane selection procedure.

Concerning encapsulation rules, these rules can define how data is to be packaged for transmission over a network. Typically, the rules can be essential for ensuring that data is correctly formatted and interpreted by different network components/equipment. Generally, encapsulation involves wrapping data with protocol-specific headers and sometimes footers to provide necessary information for data routing and delivery. Conversely, de-capsulation entails stripping the protocol-specific headers and, where applicable, the protocol-specific footers that can have been added during the encapsulation phase.

It should be noted that O-RAN is a standardization initiative aimed at creating open and standardized interfaces within the RAN of mobile networks, to promote interoperability, innovation, and flexibility by allowing different vendors' equipment and software to work together seamlessly.

In relation to the above noted HARQ this is a sophisticated error control methodology used in wireless communication systems to enhance data transmission reliability and efficiency. Typically, HARQ is a hybrid (H) combination of two techniques: forward error correction (FEC) and automatic repeat reQuest (ARQ). FEC involves adding redundant bits to data before transmission. The redundant bits generally allow receiver equipment to detect and correct certain types of errors without needing retransmissions. Common FEC codes can include Reed-Solomon, Turbo codes, and low-density parity check (LDPC) codes. ARQ involves sending data packets along with error-detection codes (e.g., cyclic redundancy check codes), whereupon if receiver equipment detects an error, it can request retransmissions of the affected packets. Generally, there are several different ARQ strategies, such as: stop-and-wait ARQ:—transmission equipment stops and waits for an acknowledgment (ACK) for each packet before sending the next one; go-back-N ARQ:—transmission equipment continues to send several packets before needing an ACK but must retransmit from the determined (N) error packet onwards in response to an error being detected; and/or selective repeat ARQ:—only specific and determined error packets are retransmitted, not the entire sequence.

In regard to this disclosure it should be observed that eCPRI and layer 2 (L2) Ethernet can be mandatory aspects for the implementation of the O-RAN front-haul interface. L2 Ethernet is the data link layer in the open systems interconnection (OSI) model, where Ethernet protocols operate. At this layer, Ethernet protocols can handle the physical addressing, error detection, and frame transmission across a communications network. Typical functions performed at L2 can include frame encapsulation where Ethernet frames are used to encapsulate data from upper layers (e.g., layer 3 (L3) and above) and prepare it for transmission over the network. Each frame can contain both a header and a trailer. Other functions that can be performed at L2 can include physical addressing where media access control (MAC) addresses can be employed to identify devices on a network. A MAC address is a unique identifier assigned to network interfaces associated with equipment comprising at least a processor. Further functionalities carried out at the L2 layer can include error detection where Ethernet frames can include a frame check sequence (FCS) field for error detection, wherein the sender calculates a cyclic redundancy check (CRC) value and includes this determined value in the frame. Thereafter the receiver recalculates the CRC value and compares the recalculated CRC value to the value in the FCS field of the received frame to detect any errors. Also performed at L2 can be flow control where the Ethernet protocol can pause frames in order to control the flow of data and to manage congestion in the network. A table 1000 illustrated in FIG. 10 provides detail in regard to O-RAN mandatory and operational features.

FIG. 11 provides illustration of table 1100 in accordance with various example embodiments described herein. The implementation details provided in the O-RAN x-haul guidelines provide that eCPRI messages can comprise an 8-byte eCPRI common header followed by a variable length eCPRI payload. Table 1100 provides a definition of an illustrated eCPRI transport header. It should be noted that the term "msb" and "lsb" respectively relate to the most significant bit (msb) and the least significant bit (lsb).

Figure 12:
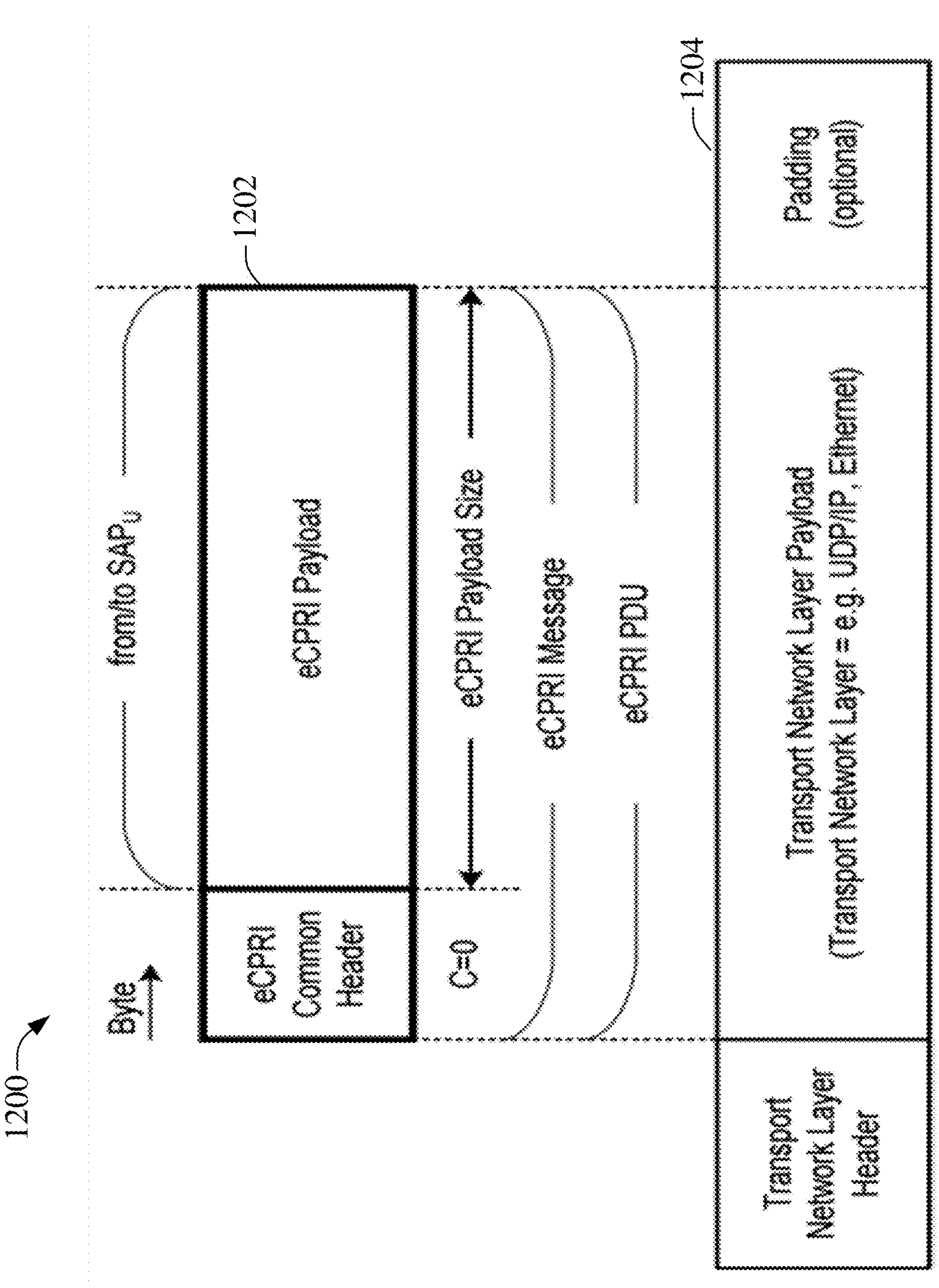
FIG. 12 provides illustration of an eCPRI message mapped onto a transport network layer, in accordance with various non-limiting example embodiments.

FIG. 12 illustrates an example eCPRI message mapped onto a transport network layer 1200 in accordance with various example embodiments of the described subject matter. As will be observed, in conjunction with details provided in relation with table 1100, that the eCPRI message 1202 comprises an eCPRI common header and an eCPRI payload, wherein the eCPRI header together with the eCPRI payload comprise an eCPRI message and/or an eCPRI physical data unit (PDU), and wherein the eCPRI payload is directed to, or received from one or more service access point (SAP). The eCPRI common header is designed to transport various types of data between the RE and the REC equipment in a radio access network. The common header provides essential information required for the proper routing and interpretation of eCPRI messages. The structure for an eCPRI common header can typically comprise the following fields: an eCPRI protocol version field, a reserved field, an eCPRI message type field, a payload size field, and an ecpriPcid. An eCPRI protocol version is generally a 4-bit field that indicates the version of the eCPRI protocol being used. The eCPRI protocol version allows for backward compatibility and future protocol updates. The reserved field typically is also a 4-bit field that is currently reserved for future use, but at this time, the reserved field should be set to zero. The eCPRI message type comprises an 8-bit field that can specify the type of message being transported. Different message types can correspond to different kinds of data or control information. Common message types can include: bit 0—in-phase and quadrature-phase (IQ) data, bit 1—bit sequence data, bit 2—real-time control data, bit 3—generic data transfer, bit 4—remote memory access data, bit 5—one-way delay measurement data, bit 6—remote reset data, and bit 7—event indication data.

The payload size field of the eCPRI common header can be a 16-bit field that indicates the size of the payload in bytes, not including the common header itself. The eCPRI common header helps the receiving end determine the length of the message and properly process the payload. The ecpriPcid can also be a 16-bit field and can be a unique identifier for the port channel. The PCID helps in managing and routing multiple data streams over the same physical connection.

In regard to the foregoing, the protocol version and reserved fields ensure that both ends of the communication (e.g., transmitting equipment and/or receiving equipment) can identify the protocol version to maintain compatibility. The reserved field ensures room for future enhancements without disrupting existing implementations. The message type field is typically crucial for the receiving end to understand the nature of the payload. For example, if the message type field is 0, the payload will comprise IQ data which can be essential for radio transmission and reception. Concerning the payload size field, knowing the payload size allows the receiver to allocate the appropriate amount of buffer space and process the incoming data quickly and correctly. The payload size field also helps in parsing the message accurately. Further, the ecpriPcid is generally used to route the message to the correct processing unit within the receiving end. Different types of data (user data, control data, synchronization data) can be handled appropriately based on their associated PCID.

The eCPRI message data can be encapsulated within a transport network layer package 1204 as a transport network layer payload, wherein the transport network layer package, inclusive of the transport network layer payload, can further comprise a transport network layer header as well as optional padding.

Figure 13:
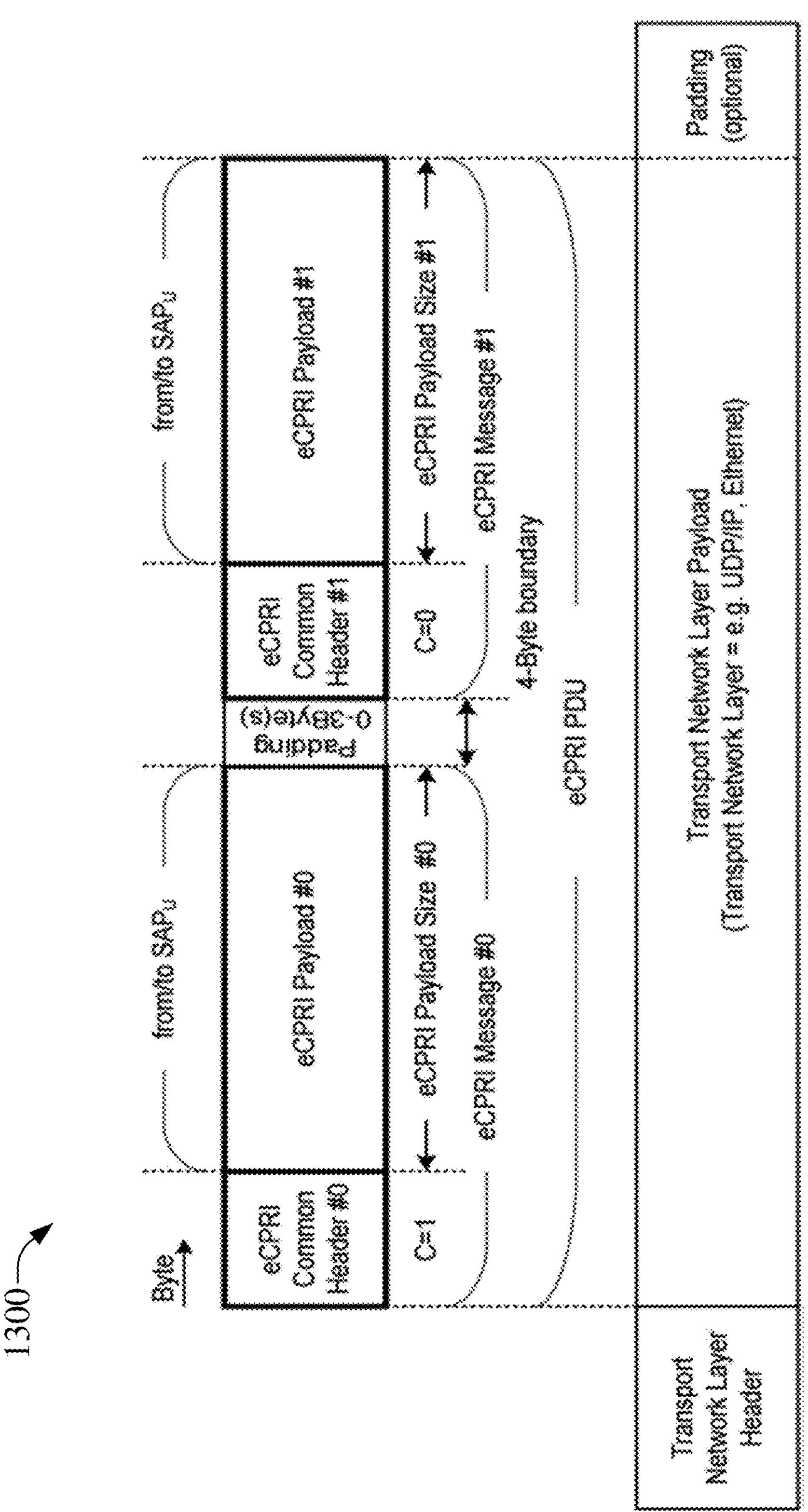
FIG. 13 illustrates the concatenation of two eCPRI messages mapped onto a transport network layer payload, in accordance with various non-limiting example embodiments.

FIG. 13 illustrates the concatenation of two eCPRI messages 1300 that can comprise an eCPRI packet data unit (PDU), in accordance with various example embodiments of the described subject matter. The concatenation of the two eCPRI messages can be encapsulated to form the transport network layer payload, wherein as noted above, the transport network layer payload can comprise a network layer header and optional padding.

The user plane (U-plane), also known as the data plane, is one of the three primary planes in a telecommunications network, alongside the control plane (C-plane) and management plane (M-plane). While the C-plane handles signaling and control messages (e.g., setting up and managing connections), the U-plane is generally dedicated to the actual user data transmission. For U-plane separate priorities through an eCPRI can be supported based on ecpriRtcid/ecpriPcid values. This can allow for different prioritization of some channels (e.g. physical random access channel (PRACH)/sounding reference signal (SRS)), and/or services (e.g., URLLC services). This can require the ability to configure priority assignments to ecpriRtcid/ecpriPcid values via M-plane messages. The default U-plane priority can be applied to flows not specifically configured with a different value via the M-plane. If node equipment does not support configurable ecpriRtcid/ecpriPcid priorities, then all U-plane traffic can use a default value.

The O-RAN architecture implementation guidelines provide typical execution times for different control loops. Typical executions times for use cases involving non-realtime control loops can be 1 second or more; near-realtime control loops can be in the range of about 10 μs or more, control loops associated with E2 networking equipment can operate below 10 μs. Typically configuring priority assignments to ecpriRtcid/ecpriPcid via M-plane messaging is generally not real-time control and the execution times therefore can be more than 1 second.

E2 networking equipment can be radio access network (RAN) equipment that can communicate with the RIC equipment via an E2 interface. Example E2 RAN equipment can comprise: gNodeB (gNB) equipment (e.g., 5G base station equipment that can provide radio access to UE); eNodeB (eNB) equipment (e.g., 4G LTE base station equipment in cases where the RIC is used in multi-RAT (Radio Access Technology) environments; centralized unit (CU) (e.g., part of the split RAN architecture, where the CU handles non-real-time operations and higher-layer protocol processing; and distributed unit (DU) (e.g., another part of the split RAN architecture, where the DU handles real-time operations and lower-layer protocol processing).

An E2 interface generally enables communication between RIC equipment and E2 equipment, allowing for: policy enforcement (e.g., implementing policies for traffic steering, load balancing, and other RAN optimization strategies), monitoring and reporting (e.g., gathering metrics and key performance indicators (KPIs) from the RAN equipment to facilitate network monitoring and analytics, and control actions (e.g., executing control commands from the RIC to adjust parameters and optimize network performance.

For URLLC services, low processing delay is desired. There can be other services which are not time sensitive in a wireless network, such as enhanced mobile broadband (eMBB) services (e.g., services where the focus is on providing significantly faster data speeds, higher capacity, and improved user experiences for mobile broadband applications). The example key features of the eMBB service are: high data rates—with peak data rates of up to 10 gigabits per second (Gbps), with typical user experiences ranging from 100 megabits per second (Mbps) to 1 Gbps; increased capacity—supports a high density of users and devices, especially in urban and densely populated areas; improved coverage—ensures reliable connectivity and high performance even in challenging environments, such as inside buildings and in rural areas; and enhanced user experience—provides seamless and uninterrupted service for high-bandwidth applications like video streaming, virtual reality (VR), and augmented reality (AR).

Other services that generally are not time sensitive can be the machine type communication (MTC) service that focuses on enabling direct communication between equipment without human intervention. The MTC service is of particular relevance for applications in the Internet of Things (IoT), smart cities, industrial automation, and other scenarios where large numbers of devices need to communicate efficiently. Additionally, the configuration and management (C&M) data flow in O-RAN is generally not time sensitive either. The C&M data flow ensures the efficient, secure, and reliable operation of network equipment and services.

The current solution for providing an enhanced front-haul interface (e.g., the segment of the network that connects the centralized radio controllers, such as BBU equipment, to the distributed radio heads or remote radio units (RRU) equipment) to support low latency communication is to ensure that time sensitive traffic in the U-plane or C-plane data flow will be set to a highest priority associated with the ecpriRtcid/ecpriPcid, which means that the data flow with the highest ecpriRtcid/ecpriPcid in the eCPRI common header will be transmitted with a higher priority over the Ethernet based transport network. The current solution, however, is deficient in that it only makes sure the data flow that conform with strict latency requirements are transmitted with priority over the transport network. The current solution does not consider priority transmissions of time sensitive data over non time sensitive data in an eCPRI lane.

Some key features of the front-haul interface are: support for the transmission of large volumes of data between a central unit (CU) and the radio units (RUs), this is necessary for high-speed mobile communication (e.g., high bandwidth); the interface ensures minimal delay in data transmission to support real-time applications and maintain synchronization between the network elements (e.g., low latency); the interface accommodates the growing number of radio units and the increasing data traffic in modern mobile networks (e.g., scalability); and the interface facilitates centralized management and dynamic allocation of resources, improving both network efficiency and adaptability (e.g., flexibility). Further, in the context of the eCPRI front-haul interface there can be more efficient bandwidth utilization, support for packet-based transport, and better scalability.

In O-RAN, the ecpriRtcid/ecpriPcid can be an eCPRI antenna carrier identifier (eAxC ID) that identifies specific data flows associated with each C-plane (e.g., ecpriRtcid) or U-plane (e.g., ecpriPcid) message. On eAxC ID can comprise a band and sector identifier (BandSector_ID), a component-carrier identifier (CC_ID). a spatial stream identifier (RU_Port_ID), and a distributed unit identifier (DU_Port_ID).

With reference to FIGS. 12 and 13 it will have been observed that the larger the eCPRI message payload, the less overhead space the eCPRI common header occupies for a defined transport network capacity. The more eCPRI messages that are concatenated in an eCPRI PDU (also as a transport network layer payload), the less overhead space the transport network layer header will occupy. As will have also been observed in connection with FIGS. 12 and 13, an example transport network layer can be an implementation of the Ethernet protocol, and/or the user datagram protocol/Internet protocol (UDP/IP). The Ethernet protocol is a protocol defined by the IEEE 802.3 standard. This protocol governs how data is to be transmitted over a network using Ethernet technology, and operates primarily at the data link layer (Layer 2) and the physical layer (Layer 1) of the 7-Layer open systems interconnection (OSI) model. The UDP/IP protocol is a core communication protocol suite used in network communication. It combines the UDP—a transport layer protocol with the IP—the network layer protocol, to provide a lightweight, efficient method for transmitting data over networks.

Nevertheless, larger eCPRI message payloads require higher processing times. Thus, concatenating more eCPRI messages in an eCPRI PDU can also increase the processing time.

In order to support URLLC services which can have extreme latency requirements (e.g., less than about 1 μs end to end latency), eCPRI within the H25 or H75 delay classes (see FIG. 9) should be selected. Currently if eCPRI with a H25 or a H75 delay class is selected, the entire data flow in the U-plane, C-plane, and/or M-plane, even without URLLC requirement, regardless of whether or not the data flow is time sensitive, can be directed through the same eCPRI lane with H25 or H75. This can cause significant overhead (e.g., eCPRI common header, Ethernet header) over the transport network for non time sensitive data (e.g., eMBB services that can be time tolerant), thus reducing transport network efficiency for these data transmissions and consequently reducing transport network efficiency and restricting system capacity as a whole.

The subject disclosure achieves ultra reliable low latency transmissions over a single eCPRI lane for some data flows at least when there is only one eCPRI lane per cell site or per O-RU, and/or when there are more than one eCPRI lanes per cell site or per O-RU, achieve the balance between meeting low latency or URLLC requirement and maximizing transport system capacity by dynamically prioritizing low latency data transmissions over more time-tolerant data transmissions in an eCPRI lane thereby making full use of different eCPRI lanes with different delay classes when there are more than one eCPRI lane per cell.

More particularly, the subject disclosure in some embodiments provides mechanisms to dynamically assign priorities for each eCPRI data packet, wherein the highest priorities are assigned for time sensitive data. Dynamically assigning priorities to eCPRI data packets can comprise determining, for each data packet that will be transmitted, via an eCPRI lane, whether (i) a data packet is U-plane data, and if so, determining whether the data packet is associated with the last HARQ transmission opportunity; and/or (ii) based on priority data, whether the data packet (e.g., C-plane, U-plane, or M-plane packet data) is time sensitive. Any data packet that satisfies conditions (i) and/or (ii) above, can be marked or indicated as being a high eCPRI priority packet.

Further, in additional and/or alternative embodiments the subject disclosure provides that for O-RAN that supports URLLC services equipped to handle multiple eCPRI lanes that the O-RAN can use eCPRI lanes associated with different disparate delay classes (e.g., a first lane associated with a first delay class (e.g., delay class A) that has low latency (e.g., High25 in FIG. 9), the other second lanes can that can be associated with a second delay class (e.g., delay class B) that has higher latency (e.g., High75 in FIG. 9)). Using disparate delay classes with O-RANs that support multiple eCPRI lanes, can be cost effective as using lower latency classes is typically associated with higher costs.

In additional and/or alternative embodiments the subject disclosure provides that for O-RAN associated with multiple eCPRI lanes of different delay classes, an eCPRI lane selection process can be performed, whereby in response to determining that a data packet has been indicated as being of a high eCPRI priority, the data packet can be sent using a first eCPRI lane that can have been associated with a first delay class that has low latency. In instances where the data packet has not been indicated as being of a high eCPRI priority, the data packet can be sent using a second eCPRI lane that can have been associated with a second delay class that has higher latency.

In still yet additional and/or alternative embodiments the subject disclosures provides a group of special high eCPRI priority packet encapsulation rules. The encapsulation rules can comprise: (i) do not fragment high priority data packets unless necessary, for example, when a high priority data packet size is larger than a defined maximum transmission unit (MTU) size, wherein the MTU size refers to the largest size of a packet or frame, inclusive of both the payload and the headers added by the various protocol stack layers, in bytes, that can be sent in a single network transmission; and (ii) refrain from concatenating high priority data packets with other eCPRI message data, such that any eCPRI data packet that has been identified as being a high eCPRI priority packet should be encapsulated based on determining, for each data packet that will be transmitted, via an eCPRI lane, whether (a) a data packet is U-plane data, and if so, determining whether the data packet is associated with the last HARQ transmission opportunity; and/or (b) based on priority data, whether the data packet (e.g., C-plane, U-plane, or M-plane packet data) is time sensitive. Any data packet that satisfies conditions (a) and/or (b) above, can be marked or indicated as being a high eCPRI priority packet.

In other additional and/or alternative embodiments the subject disclosure provides that for high eCPRI priority packet data, a high eCPRI priority can be assigned or set in eCPRI header, and performing eCPRI encapsulation based on the assigned eCPRI priority. In regard to performing eCPRI encapsulation based on the assigned eCPRI priority, in some instances the packet data with higher eCPRI priorities can be placed in a front position in queue (e.g., at the head of the queue) for eCPRI encapsulation, thereby preempting lower eCPRI priority packet data already extant in the queue in order to transmit the high eCPRI priority packet data via the eCPRI lane quickly.

The disclosed systems and methods, in accordance with various embodiments, provide a system, apparatus, or device comprising: a processor; and a memory that stores executable instructions that, when executed by the processor, facilitate performance of operations. The operations can comprise: receiving a stream of data packets comprising a first data packet associated with a time sensitive communication specification and a second data packet associated with a time tolerant communication specification, determining, based on the stream of data packets, that the first data packet is associated with a last hybrid automatic repeat request opportunity within a defined latency budget for transmission to receiver equipment, based on the first data packet being determined to be associated with the last hybrid automatic repeat request opportunity within the defined latency budget, assigning a high enhanced common public radio interface value to the first data packet; applying, based on the high enhanced common public radio interface value, an enhanced common public radio interface encapsulation process to the first data packet to create first encapsulated data; and applying a transport layer network encapsulation process to the first encapsulated data to create second encapsulated data.

Other operations can comprise transmitting the second encapsulated data to receiving equipment, and inserting the second encapsulated data at a head of an enhanced common public radio interface lane, wherein the inserting of the second encapsulated data to the head of the enhanced common public radio interface lane pre-empts any second data packet associated with the time tolerant communication specification currently in the enhanced common public radio interface lane.

Additional operation can comprise in response to receiving the stream of data packets, determining that the first data packet comprises time sensitive control-plane data, in response to receiving the stream of data packets, determining that the first data packet comprises time sensitive user-plane data, in response to receiving the stream of data packets, determining that the first data packet comprises time sensitive management-plane data, in response to receiving the second data packet associated with the time tolerant communication specification, identifying the second data packet as being associated with more than one hybrid automatic repeat request opportunity, and assigning a default enhanced common public radio interface value to the second data packet, and based on the default enhanced common public radio interface value, applying, based on the default enhanced common public radio interface value, the enhanced common public radio interface encapsulation process to the second data packet to create third encapsulated data.

Further operations can comprise using the transport layer network encapsulation process with the third encapsulated data to create fourth encapsulated data, inserting the fourth encapsulated data behind the second encapsulated data in an enhanced common public radio interface lane, and placing the fourth encapsulate data at a tail of an enhanced common public radio interface lane.

In accordance with further embodiments, the subject disclosure describes a method, comprising a sequence of acts that can include: receiving, by a device comprising at least one processor, a stream of data packets comprising a first data packet associated with a time sensitive communication requirement and a second data packet associated with a time tolerant communication requirement, based on the stream of data packets, determining, by the device, that the first data packet is associated with a last hybrid automatic repeat request opportunity within a defined latency budget for transmission to receiver equipment, based on the first data packet being associated with the last hybrid automatic repeat request opportunity within the defined latency budget, assigning, by the device, a high enhanced common public radio interface value to the first data packet, based on the high enhanced common public radio interface value, encapsulating, by the device using an enhanced common public radio interface encapsulation process, the first data packet to create first encapsulated data, and using, by the device, a transport layer network encapsulation process to encapsulate the first encapsulated data to create second encapsulated data.

Further acts can include in response to receiving the second data packet associated with the time tolerant communication requirement, identifying, by the device, the second data packet as being associated with more than one hybrid automatic repeat request opportunity, assigning, by the device, a default enhanced common public radio interface value to the second data packet, and based on the default enhanced common public radio interface value, performing, based on the default enhanced common public radio interface value, the enhanced common public radio interface encapsulation process on the second data packet to create third encapsulated data, using, by the device, the transport layer network encapsulation process with the third encapsulated data to create fourth encapsulated data, and inserting, by the device, the fourth encapsulated data behind the second encapsulated data in an enhanced common public radio interface lane.

In accordance with still further embodiments, the subject disclosure describes a machine-readable storage medium, a computer readable storage device, or non-transitory machine-readable media comprising instructions that, in response to execution, cause a computing system comprising at least one processor to perform operations. The operations can comprise: receiving a stream of data packets comprising a first data packet associated with a time sensitive communication specification and a second data packet associated with a time tolerant communication specification, determining, based on the stream of data packets, that the first data packet is associated with a last hybrid automatic repeat request functionality within a defined latency budget for transmission to receiver equipment, based on the first data packet being determined to be associated with the last hybrid automatic repeat request functionality within the defined latency budget, assigning a high enhanced common public radio interface value to the first data packet, based on the high enhanced common public radio interface value, encapsulating, using an enhanced common public radio interface encapsulation process, the first data packet to create first encapsulated data, and using a transport layer network encapsulation process to encapsulate the first encapsulated data to create second encapsulated data.

Other operations can comprise transmitting the second encapsulated data to receiving equipment, and inserting the second encapsulated data at a head of an enhanced common public radio interface lane.

Turning to FIG. 1 that depicts a system 100 to support low latency communication via an enhanced front haul interface, in accordance with various non-limiting example embodiments. System 100, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing equipment, machines, and/or database equipment, laptop computers, notebook computers, desktop computers, cell phones, smart phones, consumer appliances and/or instrumentation, industrial devices and/or components, hand-held devices, personal digital assistants, multimedia Internet enabled phones, Internet of Things (IoT) equipment, multimedia players, and the like.

System 100 can comprise interface engine 102 that can be in operative communication with processor 104, memory 106, and storage 108. Interface engine 102 can be in communication with processor 104 for facilitating operation of computer-executable instructions or machine-executable instructions and/or components by interface engine 102; memory 106 for storing data and/or computer-executable instructions and/or machine-executable instructions and/or components; and storage 108 for providing longer term storage of data and/or machine-readable instructions and/or computer-readable instructions. Additionally, system 100 can also receive input 110 for use, manipulation, and/or transformation by interface engine 102 to produce one or more useful, concrete, and tangible result, and/or transform one or more articles to different states or things. Further, system 100 can also generate and output the useful, concrete, and tangible result and/or the transformed one or more articles as output 112.

Figure 2:
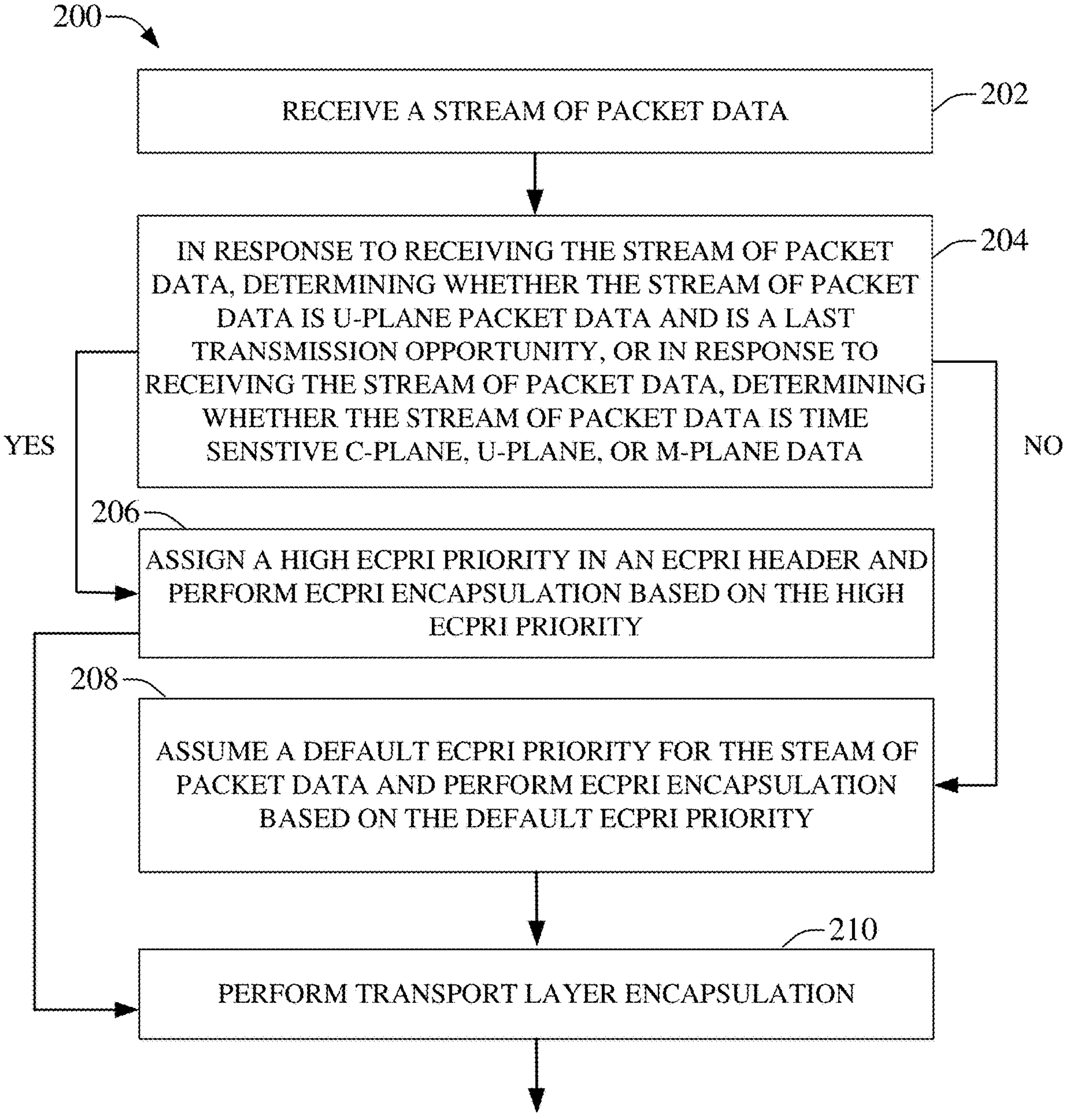
FIG. 2 depicts a method to support low latency communication via an enhanced front haul interface, in accordance with various non-limiting example embodiments.

Now with reference to FIG. 2 that provides a methodology 200 to support low latency communication via an enhanced front haul interface and FIG. 1, system 100 in collaboration with interface engine 102, and at act 202 of methodology 200, can receive as input 110 a stream of packet data. The stream of packet data can comprise a mix of data packets of various sorts, such as packet data that requires ultra low latency communications and/or high priority processing (e.g., data that is subject to ultra low latency requirements—less than 1 μs), as well as packet data that is not time sensitive and typically subject to low priority processing (e.g., packet data that is not subject to ultra low latency requirements—exceeding 1 μs).

At act 204 a decision can be made, by interface engine 102, regarding the incoming stream of packet data. Interface engine 102 can determine, based on the incoming stream of packet data, (a) whether a data packet included in the stream of packet data is a U-plane data packet, and in response to the data packet being a U-plane data packet, determining, based on a latency budget associated with U-plane data, whether the U-plane data packet is a last transmission opportunity within the latency budget to transmit the U-plane data packet, or (b) whether the data packet is (i) a C-plane data packet that is time sensitive, (ii) a M-plane data packet is time sensitive, and/or (iii) a U-plane data packet is time sensitive.

Where interface engine 102 ascertains that the data packet is a U-plane data packet that can be afforded the opportunity to be the last transmission within the latency budget to transmit the U-plane data packets, and/or the data packet is at least one of a C-plane data packet that is time sensitive, a M-plane data packet is time sensitive, and/or a U-plane data packet is time sensitive, interface engine 102 can proceed to act 206. At act 206 interface engine 102 can assign a high eCPRI priority indicator in the eCPRI header and thereafter perform encapsulation of the data packet as a function of the assigned high eCPRI priority indicator and based on an eCPRI encapsulation process. Once interface engine 102 has assigned a high eCPRI priority indicator in the eCPRI header and performed encapsulation the data packet as a function of the assigned high eCPRI priority indicator and based on an eCPRI encapsulation process, at act 210, interface engine 102 can perform transport layer encapsulation before transmitting the data packet, now encapsulated by both the eCPRI encapsulation process and the transport layer encapsulation process, to one or more receiver equipment.

Where interface engine 102, at act 204, ascertains that the data packet is a time sensitive C-plane data packet, a time sensitive M-plane data packet, and/or a time sensitive U-plane data packet, interface engine 102 can proceed to act 208 whereupon interface engine 102 assumes a default eCPRI priority for the data packet and performs eCPRI encapsulation based on the default eCPRI priority. Having performed the eCPRI encapsulation of the data packer using the default eCPRI priority, interface engine 102, at act 210 can perform transport layer encapsulation before transmitting the data packet, now encapsulated by both the eCPRI encapsulation process and the transport layer encapsulation process, to receiver equipment.

Concerning act 206, where a high eCPRI priority is assigned or set in the eCPRI header and thereafter performing an eCPRI encapsulation process in accordance with the assigned high eCPRI priority, interface engine 102 can cause the encapsulated high eCPRI priority data packet to be placed at the front of a eCPRI lane/queue, thereby preempting the queue comprising data packets that have not been assigned high eCPRI priority, so that the encapsulated high eCPRI priority data packet can be transmitted to receiver equipment with as little delay as possible (e.g., less than 1 μs). Additionally, data packets assigned a high eCPRI priority should be transmitted to ensure that there is as little, or no, fragmentation as is possible.

In order to achieve the foregoing, the eCPRI priority can be indicated by reusing the reserved field (e.g., the 3 bits depicted as the ecpriReserved field in table 1100-FIG. 11 that provides illustration of cCPRI transport header field definitions), or jointly use the ecpriReserved field and the ecpriRtcid/ecpriPcid fields as depicted in table 1400 (illustrated in FIG. 14) and table 1500 as depicted in FIG. 15. In regard to only using the ecpriReserved field depicted in 1400, eight (8) priority levels can be indicated. Additionally and/or alternatively in some embodiments by introducing a new field in the eCPRI header (e.g., that could be named as an "ecpri priority field") the priority level of an eCPRI packet can be indicated. The definitions for the introduced new field are provided in 1500.

In instances where interface engine 102 assumes a default eCPRI priority for the data packet and performs eCPRI encapsulation based on the default eCPRI priority at act 208, the data packet is placed at the tail end (e.g., the tail) of the eCPRI lane or queue.

Figure 3:
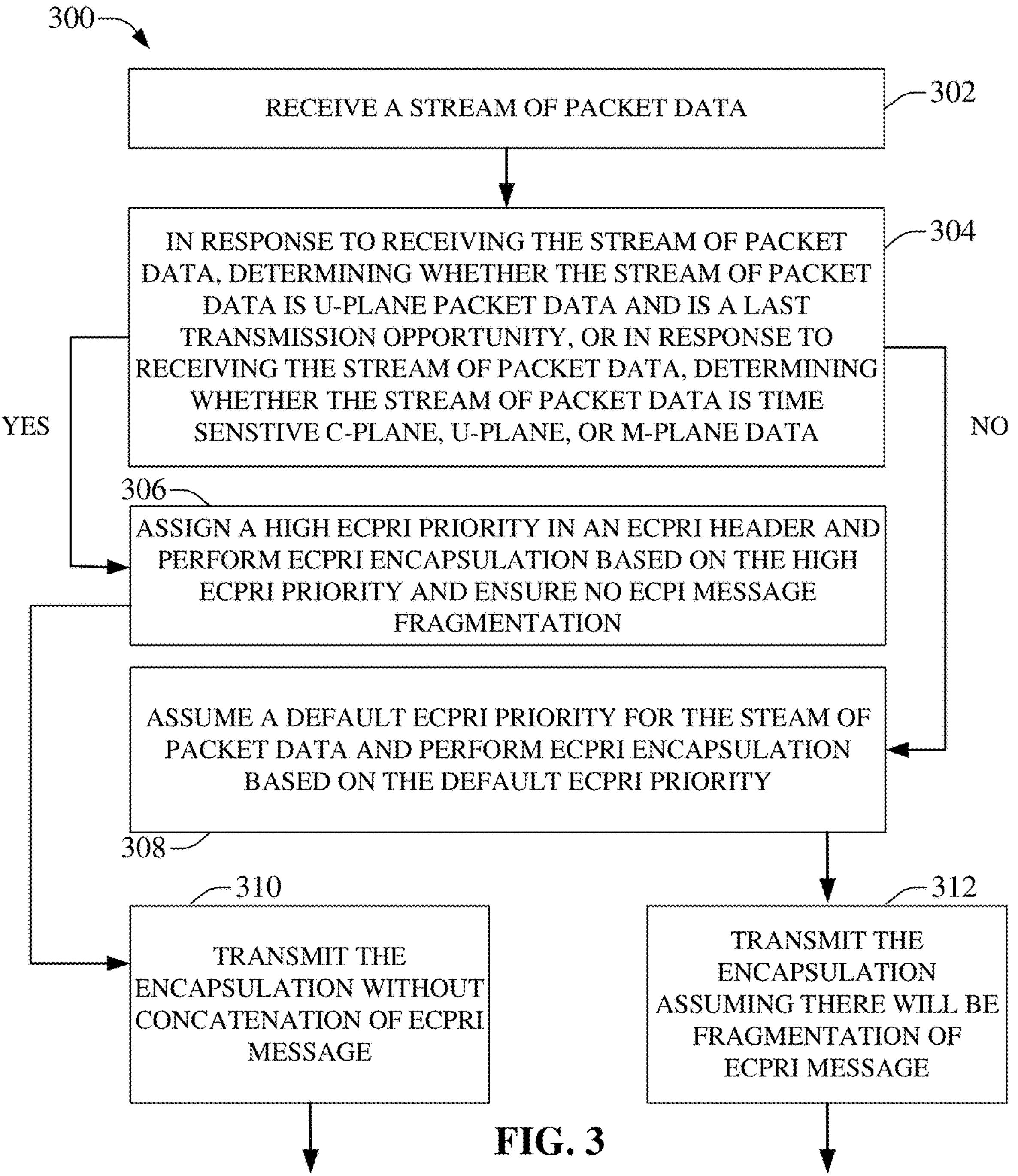
FIG. 3 illustrates a method for providing different transport network layer encapsulation for data associated with different eCPRI priorities, in accordance with various non-limiting example embodiments.

In the context of FIG. 2, in order to reduce processing delays over Ethernet based transportation networks, a different/distinct specific transport layer network processing for eCPRI with delay class A can be used. The proposed specific transport layer network processing can ensure that is no eCPRI message fragmentation, no concatenation of eCPRI messages in an eCPRI PDU for packet data flows from eCPRI. This proposed specific transport layer network processing methodology 300 is depicted in FIG. 3—a method 300 for providing different transport network layer encapsulation for data associated with different eCPRI priorities. As the transport layer network processing methodology 300 can commence at act 302 where interface engine 102 can receive a stream of packet data, and thereafter, at act 304, can determine whether the stream of packet data is U-plane packet data, that is associated with a last HARQ transmission opportunity within a latency budget for the data packet to be transmitted, or determine whether the stream of packet data is time sensitive C-plane data, U-plane data, or M-plane data.

At act 306 should interface engine 102 have determined, at act 304, that the stream of packet data is U-plane packet data, that it is associated with a last HARQ transmission opportunity within a latency budget for the data packet to be transmitted, or have determined, at act 303, that the stream of packet data is time sensitive C-plane data, U-plane data, or M-plane data, then interface engine 102 can, at act 306, assign a high eCPRI priority in the eCPRI header and thereafter perform eCPRI encapsulation based on the high eCPRI priority and ensuring that there is no eCPRI message fragmentation. Thereafter, at act 310 a specific transport layer encapsulation can be performed to ensure that there are no concatenated eCPRI messages at which point the data can be transmitted to receiver equipment.

At act 304, should interface engine 102 determine that the stream of packet data is not time sensitive C-plane data, U-plane data, or M-plane data, or that the stream of packet data is not U-plane packet data and that it is not associated with a last HARQ transmission opportunity within a latency budget for the data packet to be transmitted, interface engine 102 can assume, at act 308, a default eCPRI priority for the data, performing default eCPRI encapsulation based on the default eCPRI priority. When the data is encapsulated using the default eCPRI priority encapsulation it is possible that the eCPRI message can be fragmented if necessary. Once the default eCPRI encapsulation has taken place at act 308, interface engine 102, via methodology 300 can proceed to act 312 where general transport layer encapsulation can be performed. Using a general transport layer encapsulation means that the eCPRI message can be concatenated where needed.

In some embodiments interface engine 102 can implement method 400 for packet data from U-plane, M-plane, and C-plane, according to characteristics of the stream of incoming packet data, such as whether the U-plane, M-plane, or C-plane data is time sensitive or not. Time sensitive data can be placed in an eCPRI lane associated with delay class A (e.g., High 25). Time sensitive data can be, for example, a real time control messages from the C-plane, high priority channels (e.g., PRACH and SRS) from the U-plane, control messages for interactive traffic from the M-plane, or data with a latency requirement (e.g., packet delay budget) from the U-plane.

Time tolerant data can be directed through eCPRI lanes associated with delay class B (e.g., High 100). As will be appreciated eCPRI lanes associated the delay class A can have less delay than eCPRI lanes associated with delay class B.

Associating packet data flows with eCPRI lanes with different delay classes can be either defined in standard specification(s), or can be configured via M-Plane messaging, which is not updated in real time, which should be >=1 s. It means that eCPRI lane with a delay class can be chosen for certain data packet in predefined or semi-static way.

Figure 4:
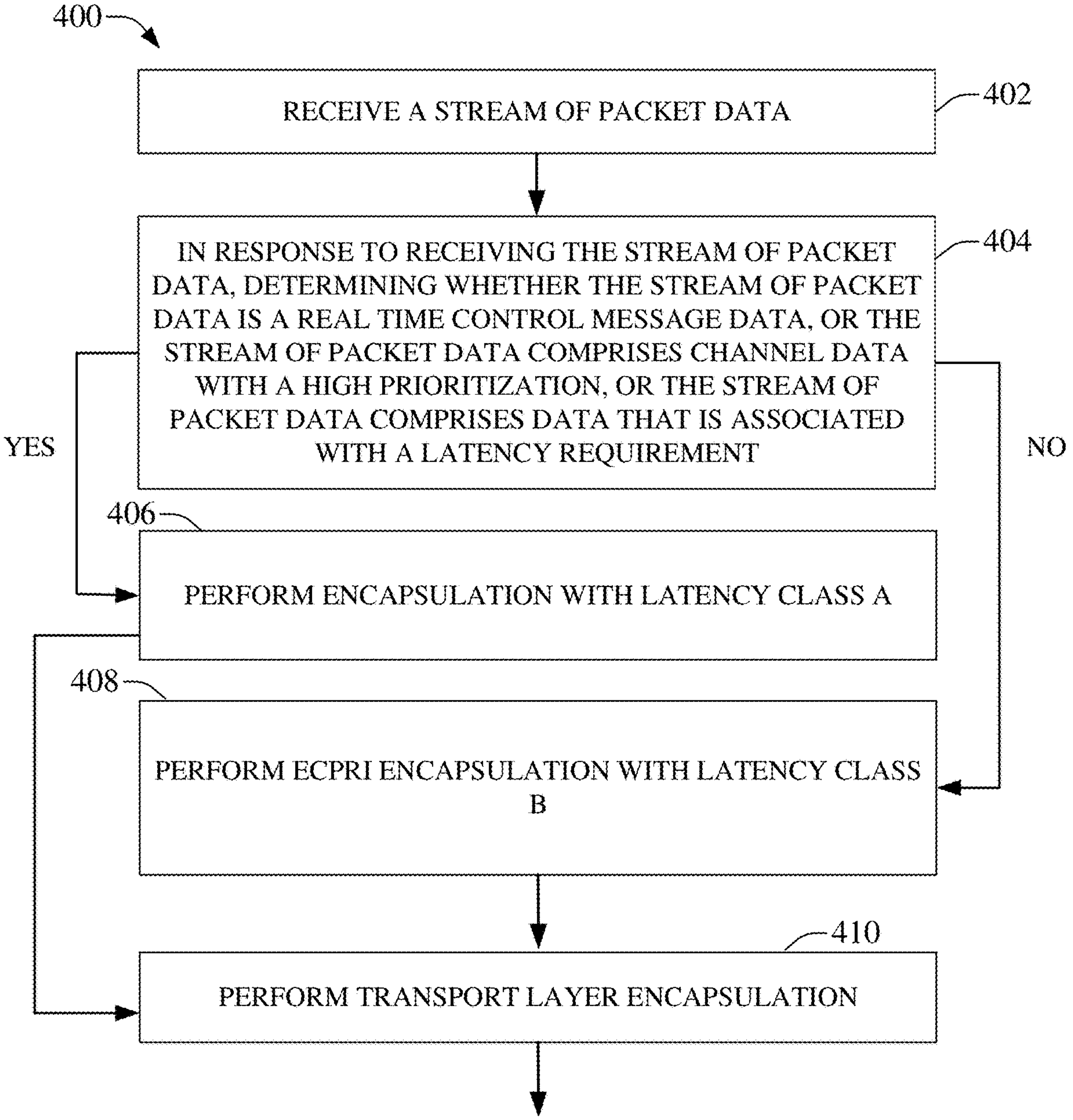
FIG. 4 illustrates a method for an enhanced front haul interface to support different priority transmissions in eCPRI lanes, in accordance with various non-limiting example embodiments.

With reference to 400, depicted in FIG. 4, can commence at act 402 wherein interface engine 102 can receive a stream of packet data. At act 404 a determination can be made as to whether the stream of incoming packet data is real time control message data, or the stream of incoming packet data comprises channel data (e.g., PRACH and/or SRS) associated with a high prioritization, or the stream of incoming packet data comprises data that is associated with a latency requirement (e.g. URLLC). In instances where interface engine 102 determines that the stream of incoming packet data is real time control message data, or determines that the stream of incoming packet data comprises channel data associated with a high prioritization, or determines that the stream of incoming packet data comprises data that is associated with a latency requirement, the methodology can proceed to act 406 where interface engine 102 can perform encapsulation with latency class A. Thereafter, the methodology can proceed to act 410 where transport layer encapsulation can be performed.

Alternatively, where interface engine 102, at act 404, determines that the stream of incoming packet data is not real time control message data, or determines that the stream of incoming packet data does not comprise channel data associated with a high prioritization, or determines that the stream of incoming packet data does not comprise data that is associated with a latency requirement, the methodology can proceed to act 408 where interface engine 102 can perform encapsulation with latency class B, after which at act 410 transport layer encapsulation can be performed.

Figure 5:
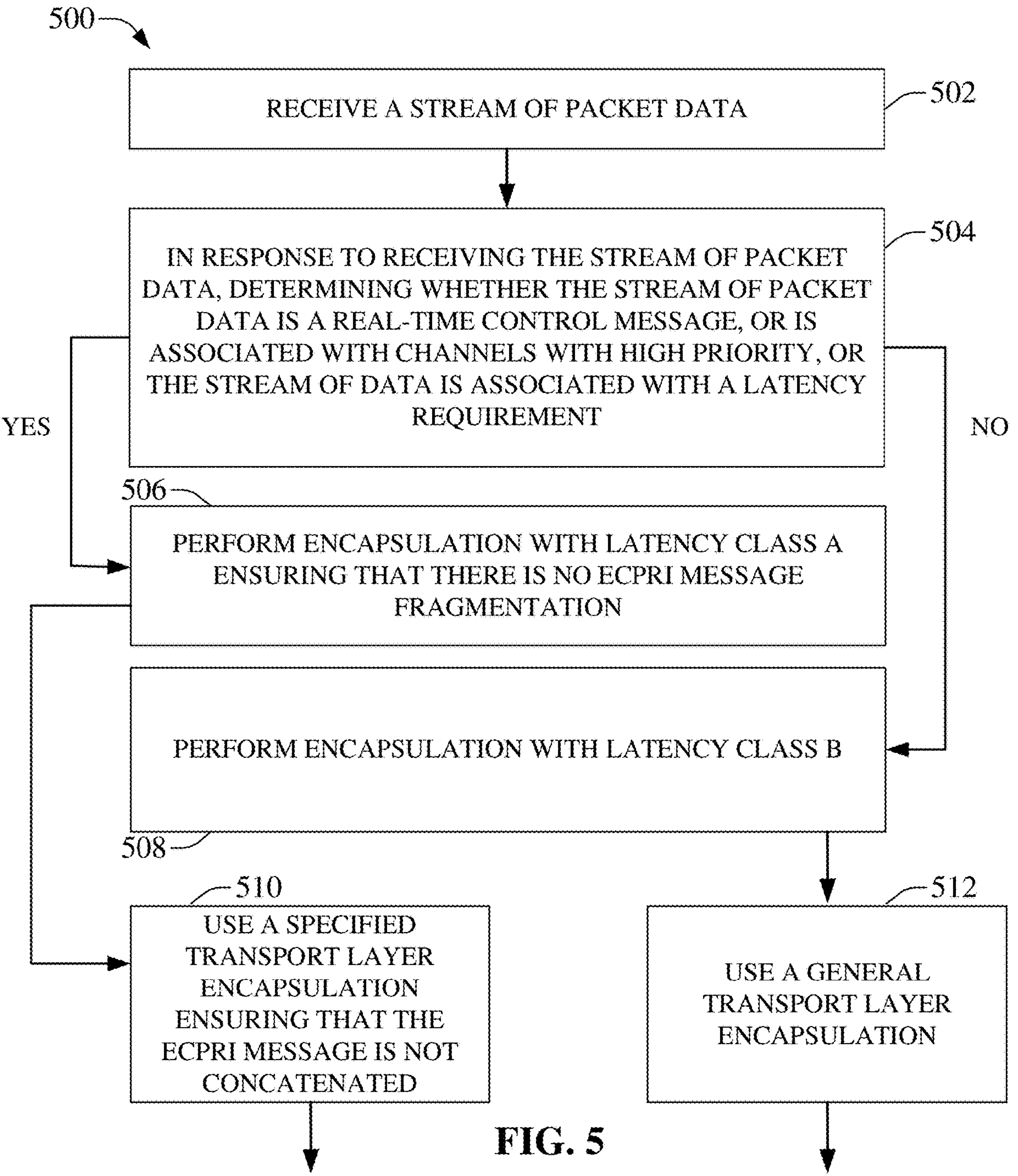
FIG. 5 illustrates a method for different transportation encapsulations for data from different eCPRI lanes, in accordance with various non-limiting example embodiments.

In order to reduce processing delays over Ethernet based transportation network architectures, a different transport network processing for eCPRI with delay class A is introduced and can be performed. In accordance with the introduced different transport network processing for eCPRI with delay class A, there can be no concatenation of eCPRI messages in an eCPRI PDU. Thus, the different transport network processing for eCPRI with delay class A, method 500 illustrated in FIG. 5 can commence at act 502 where a stream of packet data can be received by interface engine 102. At act 504 interface engine 102 can determine whether the stream of packet data is real time control message data, or is associated with channels with high priority, or the stream of packet data is associated with a latency requirement. Where, at act 504, interface engine 102 determines that the stream of packet data is real time control message data, or is associated with channels with high priority, or the stream of packet data is associated with a latency requirement, methodology 500 can proceed to act 506, where interface engine 102 can perform encapsulation with latency class A ensuring that there is no eECPRI message fragmentation, after which at act 510 a specific transport layer encapsulation process that ensures that the eCPRI message is not concatenated.

Alternatively, at act 504, should interface engine 102 determine that one or more of the stream of packet data is not real time control message data, or is not associated with channels with high priority, or the stream of packet data is not associated with a latency requirement, the method 500 can move to act 512 where interface engine 102 can perform general transport layer encapsulation with latency class B. Performing general transport layer encapsulation with latency class B implies that eCPRI messages can be concatenated.

Figure 6:
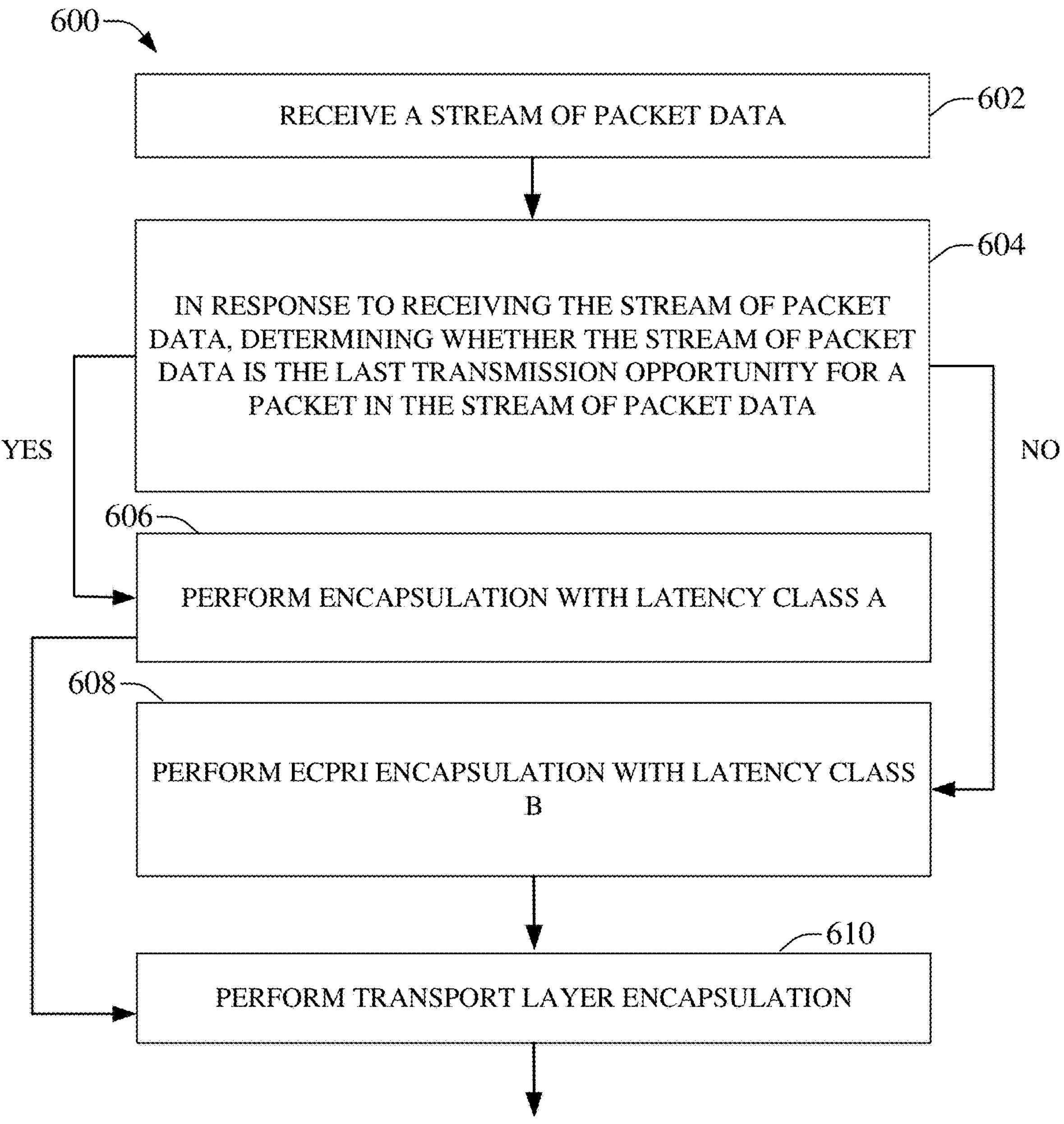
FIG. 6 depicts for dynamically selecting an eCPRI lane for U-plane data, in accordance with various non-limiting example embodiments.

In additional embodiments, interface engine 102 can implement method 600, a method for dynamically selecting an eCPRI lane for U-plane data, as illustrated in FIG. 6. According to this embodiment for given data flow from U-plane, if it is not the last transmission opportunity within latency budget for this packet, even though the packet is has a high priority and is very sensitive to delay, the packet can still go through eCPRI encapsulation with a latency class B in order to save overhead and improve transport network transmission efficiency; If it is the last transmission opportunity within the latency budget for this packet, the packet should go through eCPRI encapsulation with a latency class A, and should be assigned an ecpriPcid which is associated with a priority configured via M-Plane message. Thus, the packet which is assigned ecpriPcid associated with a priority will be treated in a priority way during transmission in transport network to reduce process delay over transport network, for example, no concatenated eCPRI message in an eCPRI PDU to reduce processing delay, the best forward path which can have less transport delay over transport network; having priority forwarding in each routing node.

With reference to method 600, commencing at act 602 a stream of packet data can be received by interface engine 102, whereupon at act 604 interface engine 102 can determine whether the stream of incoming packet data is the last transmission opportunity for a packet in the stream of packet data. If at act 604 interface engine 102 determines that the stream of incoming packet data is the last transmission opportunity for a packet in the stream of packet data, interface engine 102 can perform an encapsulation with latency class A (e.g., High 25) at act 606. Conversely where interface engine 102 determines at act 604 that the stream of incoming packet data is not the last transmission opportunity for a packet in the stream of packet data, at act 608 interface engine 102 can perform an encapsulation with latency class B (e.g., High 100). Thereafter, once interface engine 102 has either performed encapsulation with latency class A, or performed encapsulation with latency class B, interface engine 102 can proceed to act 610, where it can perform transport layer encapsulation.

Figure 7:
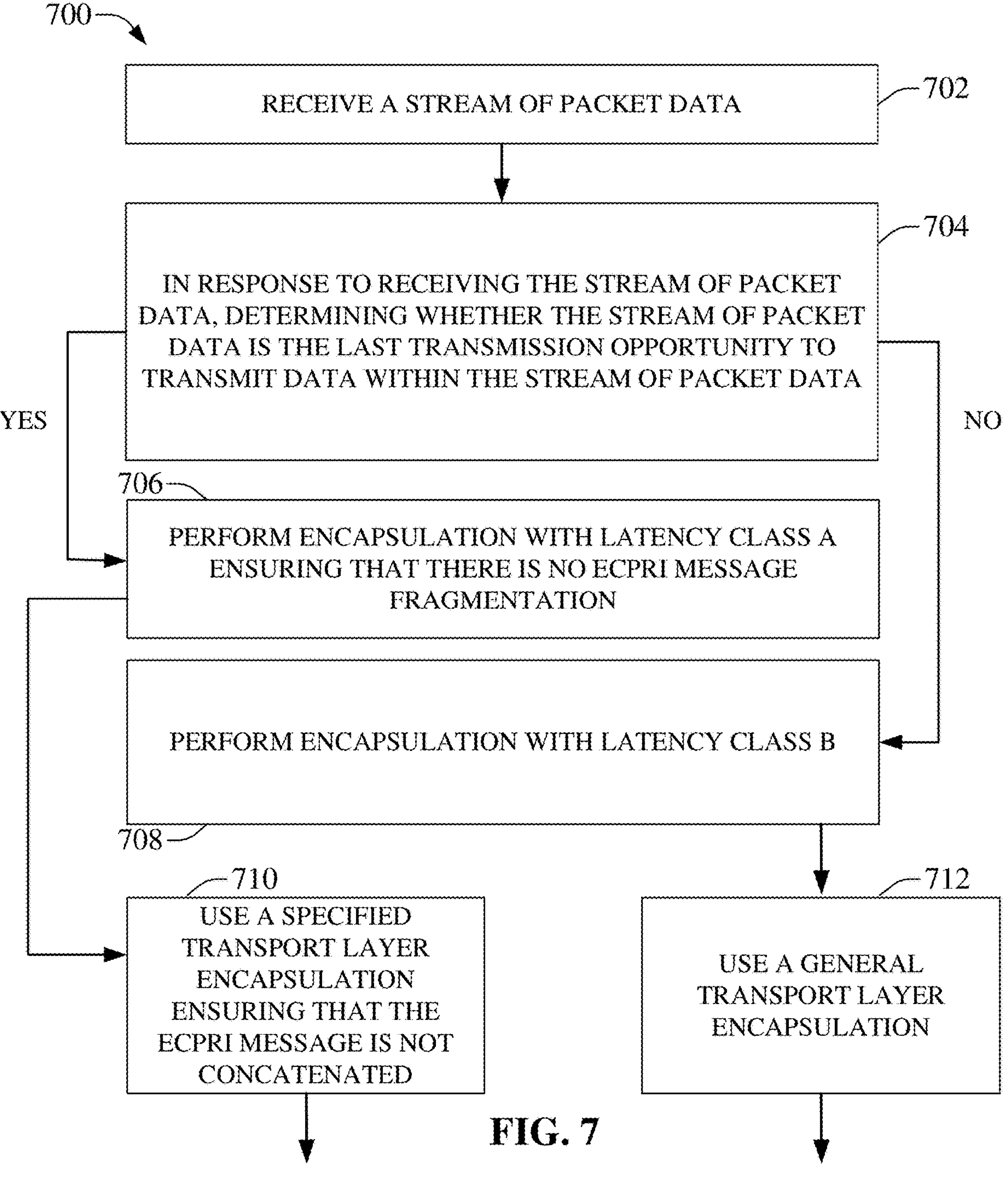
FIG. 7 depicts a method for using different transport layer network encapsulation processes for data with different eCPRI priorities, in accordance with various non-limiting example embodiments.

In order to reduce processing delay over the Ethernet based transport network architecture, a different transport network processing for eCPRI with delay class A can be implemented, wherein there can be no eCPRI message fragmentation, no concatenation of eCPRI messages in an eCPRI PDU for packet data flows associated with eCPRI with delay class A. Accordingly, with reference to FIG. 7, a method 700 is illustrated for using different transport layer network encapsulation processes for data with different eCPRI priorities. Method 700 can begin at act 702 where interface engine 102 can receive a stream of packet data. At act 704 interface engine 102 can determine whether the stream of packet data is the last transmission opportunity for a packet in the stream of packet data. If at act 704 interface engine 102 determines that the stream of packet data is the last transmission opportunity for a packet in the stream of packet data, interface engine 102, at act 706 can perform encapsulation of the packet data using latency class A and ensuring that there is no eCPRI message fragmentation. If at act 704 interface engine 102 determines that the stream of packet data is not the last transmission opportunity for a packet in the stream of packet data, interface engine 102, at act 708.

Once interface engine 102 has performed the encapsulation of the packet data using latency class A and ensuring that there is no eCPRI message fragmentation at act 706, method 700 proceeds to act 710 where interface engine 102 can use a specified transport layer encapsulation that ensures that the eCPRI message is not concatenated.

Once interface engine 102 has performed the encapsulation of the packet data using latency class B at act 708, method 700 can use a general transport layer encapsulation process to encapsulate the eCPRI message at act 712.

Figure 8:
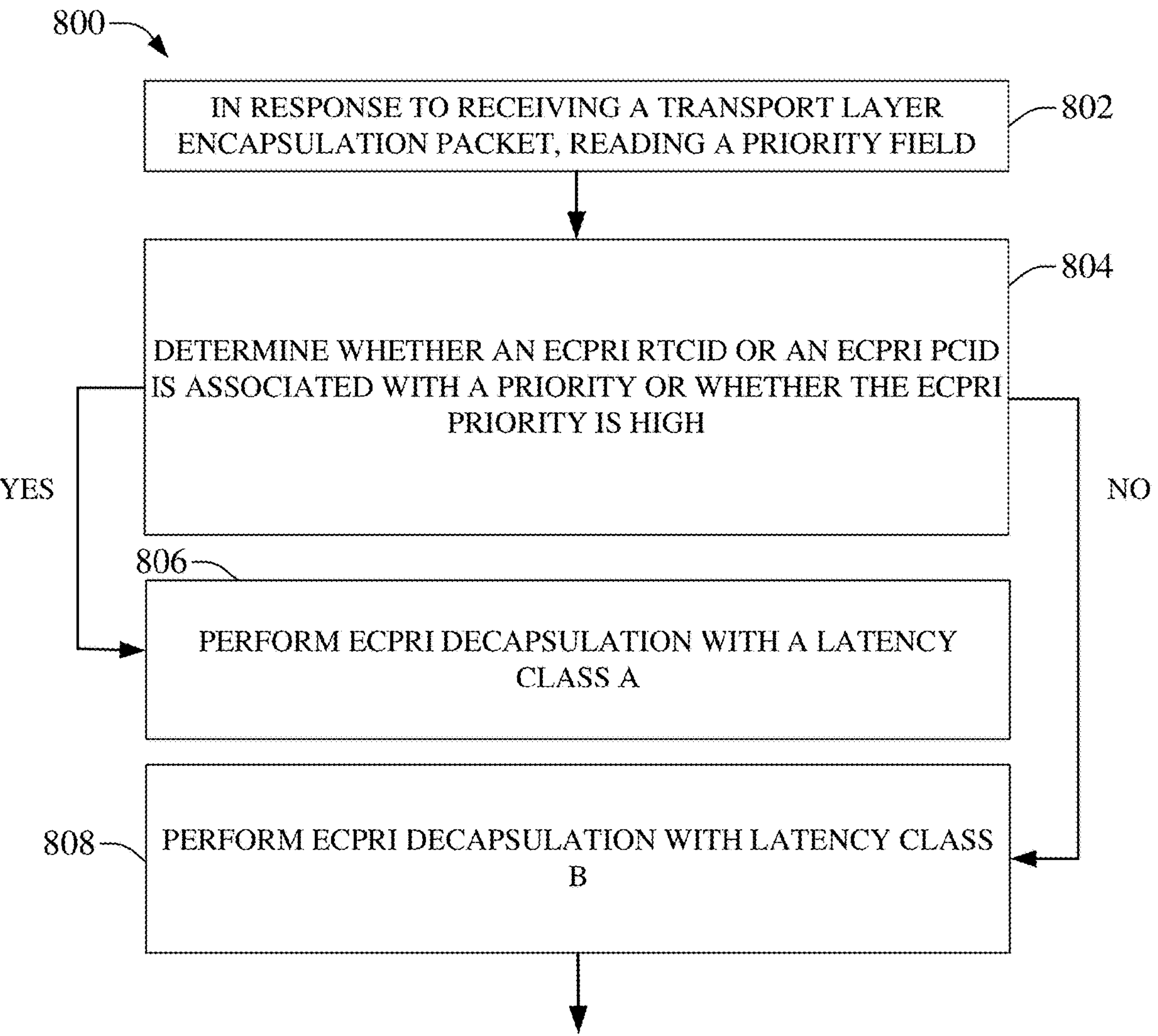
FIG. 8 illustrates a decapsulating method for decapsulating transport layer network encapsulations, in accordance with various non-limiting example embodiments.

FIG. 8 illustrates a decapsulation method 800 that can be implemented by interface engine 202. As illustrated method 800 can begin at act 802 where interface engine 102 in response to receiving a stream of transport layer encapsulated data packets, interface engine 102 can read an ecpriRtcid/ecpriPcid priority data or eCPRI priority data included in eCPRI message header of a packet of the stream transportation encapsulated data packets. At act 804 interface engine 102 based on the ecpriRtcid/ecpriPcid priority data being associated with a priority or the eCPRI priority data being indicated as high, can perform, at act 806, an eCPRI decapsulation that is associated with latency class A (e.g., High 25). Where at act 804 interface engine 102 determines that the ecpriRtcid/ecpriPcid priority data is not associated with a priority or the eCPRI priority data is not indicated as being high, interface engine 102 can perform an eCPRI decapsulation associated with latency class B (e.g., High 100). eCPRI encapsulation/decapsulation with latency class A can have different processing from eCPRI encapsulation/decapsulation with latency class B. For instance, the latency class associated with High 25, for instance, can have a short reception window in order to reduce processing time in contrast to a latency class associated with High 100. Thus, for purposes of this disclosure the latency classes should be known before performing eCPRI encapsulation and decapsulation.

Figure 16:
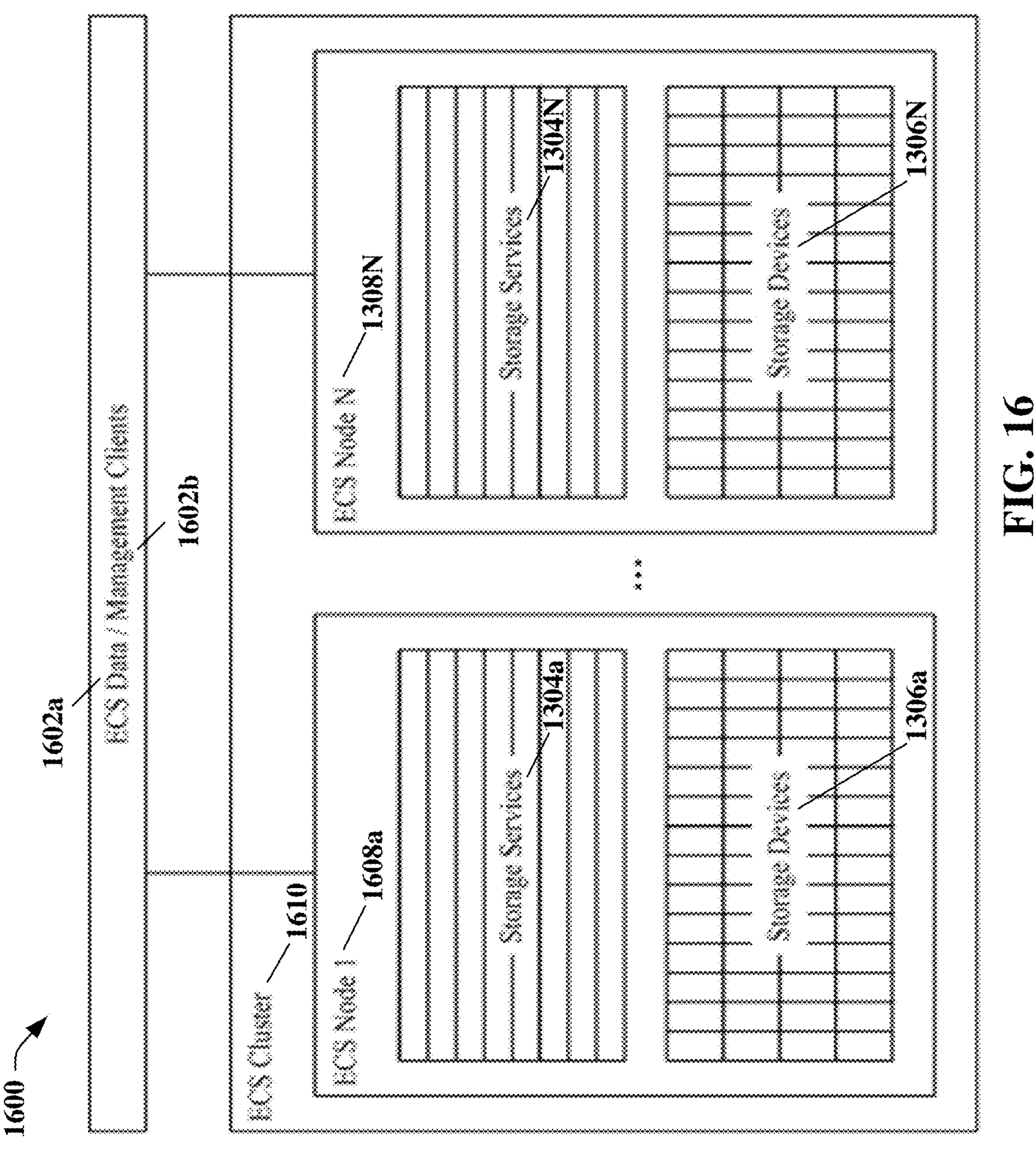
FIG. 16 illustrates an elastic cloud storage (ECS) system, in accordance with various non-limiting example embodiments.

In the following, FIG. 16 describes an example non-limiting cloud storage system in the non-limiting context of an ECS storage system, but for the avoidance of doubt, the subject embodiments can apply to any storage platform. For instance, in this regard, FIG. 16 illustrates an ECS storage system 1600 comprising a cloud-based object storage appliance in which corresponding storage control software comprising, e.g., ECS data client(s) 1602*a*, ECS management client(s) 1602*b*, storage service(s) 1604*a* . . . 1604N, etc. and storage devices 1606*a* . . . 1606N (e.g., storage media, such as physical magnetic disk media, etc. of respective ECS nodes of ECS cluster 1610) are combined as an integrated system with no access to the storage media other than through the ECS storage system 1600.

In this regard, ECS cluster 1610 comprises multiple nodes 1608*a* . . . 1608N, storage nodes, ECS nodes, etc. Each node is associated with storage devices 1606*a* . . . 1606N, e.g., hard drives, physical disk drives, storage media, etc. In embodiment(s), ECS node 1608*a*, or any ECS node, executing on a hardware appliance can be communicatively coupled, connected, cabled to, etc., e.g., 15 to 120 storage devices. Further, each ECS node can execute one or more services for performing data storage operations described herein.

For instance, the ECS storage system 1600 can be an append-only virtual storage platform that protects content from being erased or overwritten for a specified retention period. In particular, the ECS storage system 1600 does not employ traditional data protection schemes like mirroring or parity protection. Instead, the ECS storage system 1600 utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS storage system 1600 can support storage, manipulation, and/or analysis of unstructured data on a massive scale on commodity hardware. As an example, the ECS storage system 1600 can support mobile, cloud, big data, and/or social networking applications. In another example, the ECS storage system 1600 can be deployed as a turnkey storage appliance, or as a software product that can be installed on a set of qualified commodity servers and disks, e.g., within a node, data storage node, etc. of a cluster, data storage cluster, etc. In this regard, the ECS storage system 1600 can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by variance engine 102.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1722, disk storage 1724, and/or memory storage 1746, further description of which is below. For instance, nonvolatile memory can be included in read only memory (ROM), programmable ROM (PROM), electrically programmable ROM (EPROM), electrically erasable ROM (EEPROM), or flash memory. Volatile memory 1720 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 17:
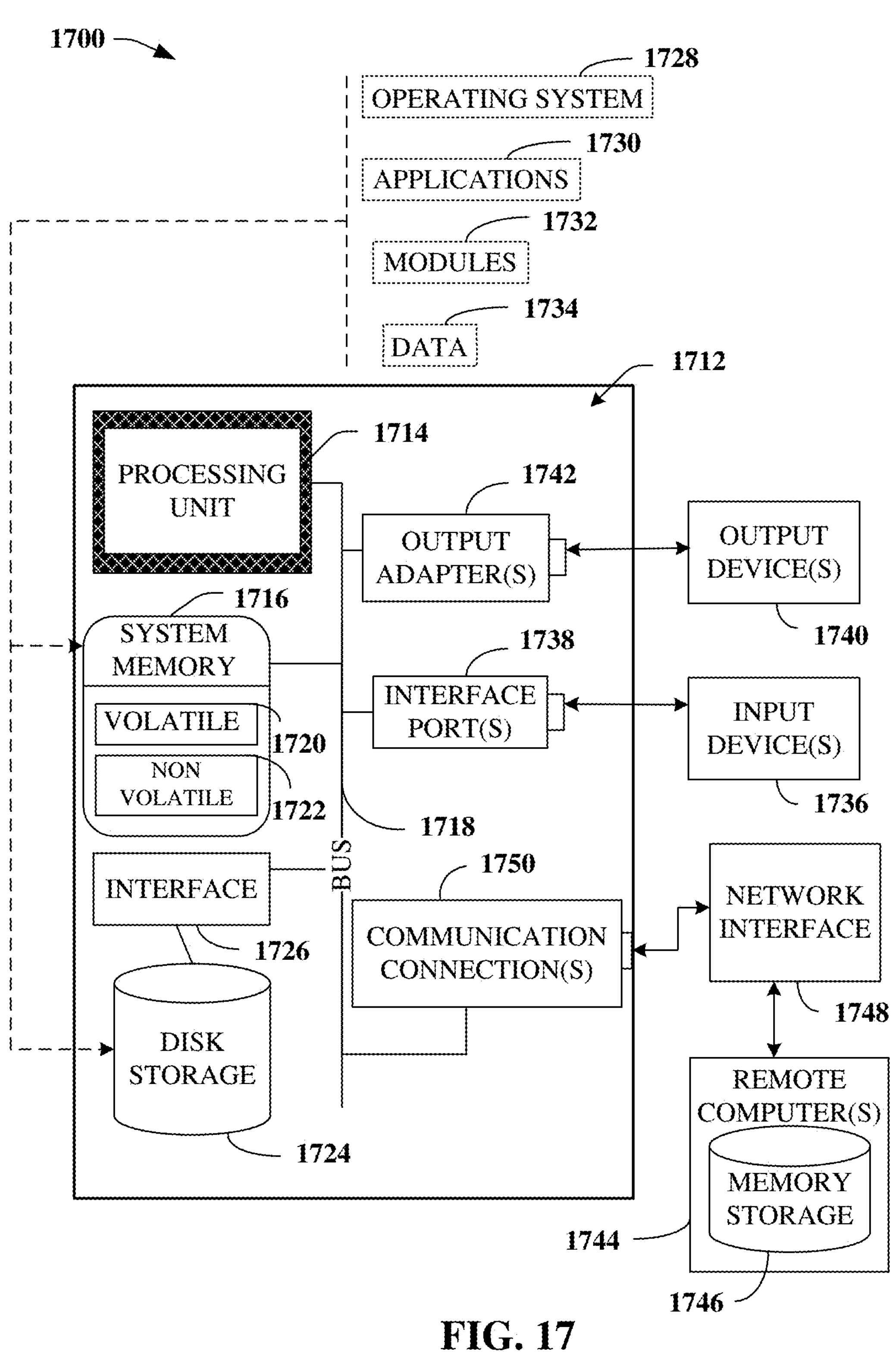
FIG. 17 illustrates a block diagram representing an illustrative non-limiting computing system or operating environment in which one or more aspects of various non-limiting embodiments described herein can be implemented.

In order to provide a context for the various aspects of the disclosed subject matter, FIG. 17, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 17, a block diagram of a computing system 1700, e.g., system 170, operable to execute the disclosed systems and methods is illustrated, in accordance with an embodiment. Computer 1712 comprises a processing unit 1714, a system memory 1716, and a system bus 1718. System bus 1718 couples system components comprising, but not limited to, system memory 1716 to processing unit 1714. Processing unit 1714 can be any of various available processors. Dual microprocessors and other multiprocessor architectures also can be employed as processing unit 1714.

System bus 1718 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1716 comprises volatile memory 1720 and nonvolatile memory 1722. A basic input/output system (BIOS), containing routines to transfer information between elements within computer 1712, such as during start-up, can be stored in nonvolatile memory 1722. By way of illustration, and not limitation, nonvolatile memory 1722 can comprise ROM, PROM, EPROM, EEPROM, or flash memory. Volatile memory 1720 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1712 also comprises removable/non-removable, volatile/non-volatile computer storage media. FIG. 17 illustrates, for example, disk storage 1724. Disk storage 1724 comprises, but is not limited to, devices like a magnetic disk drive, floppy disk drive, tape drive, Jaz drive, Zip drive, LS-100 drive, flash memory card, or memory stick. In addition, disk storage 1724 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to system bus 1718, a removable or non-removable interface is typically used, such as interface 1726.

It is to be appreciated that FIG. 17 describes software that acts as an intermediary between users and computer resources described in suitable operating environment 1700. Such software comprises an operating system 1728. Operating system 1728, which can be stored on disk storage 1724, acts to control and allocate resources of computer system 1712. System applications 1730 take advantage of the management of resources by operating system 1728 through program modules 1732 and program data 1734 stored either in system memory 1716 or on disk storage 1724. It is to be appreciated that the disclosed subject matter can be implemented with various operating systems or combinations of operating systems.

A user can enter commands or information into computer 1712 through input device(s) 1736. Input devices 1736 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1714 through system bus 1718 via interface port(s) 1738. Interface port(s) 1738 comprise, for example, a serial port, a parallel port, a game port, a universal serial bus (USB), a wireless based port, e.g., Wi-Fi, Bluetooth, etc. Output device(s) 1740 use some of the same type of ports as input device(s) 1736.

Thus, for example, a USB port can be used to provide input to computer 1712 and to output information from computer 1712 to an output device 1740. Output adapter 1742 is provided to illustrate that there are some output devices 1740, like display devices, light projection devices, monitors, speakers, and printers, among other output devices 1740, which use special adapters. Output adapters 1742 comprise, by way of illustration and not limitation, video and sound devices, cards, etc. that provide means of connection between output device 1740 and system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. Remote computer(s) 1744 can be a personal computer, a server, a router, a network PC, a workstation, a microprocessor based appliance, a peer device, or other common network node and the like, and typically comprises many or all of the elements described relative to computer 1712.

For purposes of brevity, only a memory storage device 1746 is illustrated with remote computer(s) 1744. Remote computer(s) 1744 is logically connected to computer 1712 through a network interface 1748 and then physically and/or wirelessly connected via communication connection 1750. Network interface 1748 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1750 refer(s) to hardware/software employed to connect network interface 1748 to bus 1718. While communication connection 1750 is shown for illustrative clarity inside computer 1712, it can also be external to computer 1712. The hardware/software for connection to network interface 1748 can comprise, for example, internal and external technologies such as modems, comprising regular telephone grade modems, cable modems and DSL modems, wireless modems, ISDN adapters, and Ethernet cards.

The computer 1712 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1712 can connect to other devices/networks by way of antenna, port, network interface adaptor, wireless access point, modem, and/or the like.

The computer 1712 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least processor, facilitate performance of operations, comprising:

receiving a stream of data packets comprising a first data packet associated with a time sensitive communication specification and a second data packet associated with a time tolerant communication specification;

determining, based on the stream of data packets, that the first data packet is associated with a last hybrid automatic repeat request opportunity within a defined latency budget for transmission to receiver equipment;

based on the first data packet being determined to be associated with the last hybrid automatic repeat request opportunity within the defined latency budget, assigning a high enhanced common public radio interface value to the first data packet;

applying, based on the high enhanced common public radio interface value, an enhanced common public radio interface encapsulation process to the first data packet to create first encapsulated data; and applying a transport layer network encapsulation process to the first encapsulated data to create second encapsulated data.

2. The system of claim 1, wherein the operations further comprise transmitting the second encapsulated data to receiving equipment.

3. The system of claim 1, wherein the operations further comprise inserting the second encapsulated data at a head of an enhanced common public radio interface lane.

4. The system of claim 3, wherein the inserting of the second encapsulated data to the head of the enhanced common public radio interface lane pre-empts any second data packet associated with the time tolerant communication specification currently in the enhanced common public radio interface lane.

5. The system of claim 1, wherein the operations further comprise, in response to receiving the stream of data packets, determining that the first data packet comprises time sensitive control-plane data.

6. The system of claim 1, wherein the operations further comprise, in response to receiving the stream of data packets, determining that the first data packet comprises time sensitive user-plane data.

7. The system of claim 1, wherein the operations further comprise, in response to receiving the stream of data packets, determining that the first data packet comprises time sensitive management-plane data.

8. The system of claim 1, wherein the operations further comprise, in response to receiving the second data packet associated with the time tolerant communication specification, identifying the second data packet as being associated with more than one hybrid automatic repeat request opportunity.

9. The system of claim 8, wherein the operations further comprise assigning a default enhanced common public radio interface value to the second data packet, and based on the default enhanced common public radio interface value, applying, based on the default enhanced common public radio interface value, the enhanced common public radio interface encapsulation process to the second data packet to create third encapsulated data.

10. The system of claim 9, wherein the operations further comprise using the transport layer network encapsulation process with the third encapsulated data to create fourth encapsulated data.

11. The system of claim 10, wherein the operations further comprise inserting the fourth encapsulated data behind the second encapsulated data in an enhanced common public radio interface lane.

12. The system of claim 10, wherein the operations further comprise placing the fourth encapsulate data at a tail of an enhanced common public radio interface lane.

13. A method, comprising:

receiving, by a device comprising at least one processor, a stream of data packets comprising a first data packet associated with a time sensitive communication requirement and a second data packet associated with a time tolerant communication requirement;

based on the stream of data packets, determining, by the device, that the first data packet is associated with a last hybrid automatic repeat request opportunity within a defined latency budget for transmission to receiver equipment;

based on the first data packet being associated with the last hybrid automatic repeat request opportunity within the defined latency budget, assigning, by the device, a high enhanced common public radio interface value to the first data packet;

based on the high enhanced common public radio interface value, encapsulating, by the device using an enhanced common public radio interface encapsulation process, the first data packet to create first encapsulated data; and using, by the device, a transport layer network encapsulation process to encapsulate the first encapsulated data to create second encapsulated data.

14. The method of claim 13, further comprising, in response to receiving the second data packet associated with the time tolerant communication requirement, identifying, by the device, the second data packet as being associated with more than one hybrid automatic repeat request opportunity.

15. The method of claim 14, further comprising assigning, by the device, a default enhanced common public radio interface value to the second data packet, and performing, based on the default enhanced common public radio interface value, the enhanced common public radio interface encapsulation process on the second data packet to create third encapsulated data.

16. The method of claim 15, further comprising using, by the device, the transport layer network encapsulation process with the third encapsulated data to create fourth encapsulated data.

17. The method of claim 16, further comprising inserting, by the device, the fourth encapsulated data behind the second encapsulated data in an enhanced common public radio interface lane.

18. A non-transitory machine-readable medium comprising instructions that, in response to execution, cause a system comprising at least one processor to perform operations, comprising:

receiving a stream of data packets comprising a first data packet associated with a time sensitive communication specification and a second data packet associated with a time tolerant communication specification;

determining, based on the stream of data packets, that the first data packet is associated with a last hybrid automatic repeat request functionality within a defined latency budget for transmission to receiver equipment;

based on the first data packet being determined to be associated with the last hybrid automatic repeat request functionality within the defined latency budget, assigning a high enhanced common public radio interface value to the first data packet;

based on the high enhanced common public radio interface value, encapsulating, using an enhanced common public radio interface encapsulation process, the first data packet to create first encapsulated data; and using a transport layer network encapsulation process to encapsulate the first encapsulated data to create second encapsulated data.

19. The non-transitory machine-readable medium of claim 18, wherein the operations further comprise transmitting the second encapsulated data to receiving equipment.

20. The non-transitory machine-readable medium of claim 18, wherein the operations further comprise inserting the second encapsulated data at a head of an enhanced common public radio interface lane.

* * * * *